United States Patent
Mitamura et al.

(10) Patent No.: US 6,807,335 B2
(45) Date of Patent: Oct. 19, 2004

(54) WAVELENGTH CHARACTERISTIC VARIABLE APPARATUS

(75) Inventors: Nobuaki Mitamura, Sapporo (JP); Norihisa Naganuma, Sapporo (JP)

(73) Assignee: Fujitsu Limited, Kawasaki (JP)

( * ) Notice: Subject to any disclaimer, the term of this patent is extended or adjusted under 35 U.S.C. 154(b) by 391 days.

(21) Appl. No.: 09/984,396

(22) Filed: Oct. 30, 2001

(65) Prior Publication Data

US 2003/0021527 A1 Jan. 30, 2003

(30) Foreign Application Priority Data

Jul. 25, 2001 (JP) ........................................ 2001-223830

(51) Int. Cl.$^7$ ................................................ G02B 6/26
(52) U.S. Cl. .......................... 385/31; 385/24; 385/36; 385/88; 385/92
(58) Field of Search ............................. 385/27, 28, 31, 385/49, 88, 89, 92, 24, 36

(56) References Cited

U.S. PATENT DOCUMENTS

| | | | | |
|---|---|---|---|---|
| 4,244,045 A | * | 1/1981 | Nosu et al. .................... 398/86 |
| 5,234,772 A | * | 8/1993 | Oguchi et al. ........... 428/473.5 |
| 5,731,904 A | * | 3/1998 | Yang .......................... 359/634 |
| 5,844,735 A | * | 12/1998 | Shurtz et al. ................ 359/885 |
| 5,930,441 A | | 7/1999 | Betts et al. .................. 385/140 |
| 5,949,928 A | * | 9/1999 | Kadoi et al. .................. 385/14 |
| 6,094,446 A | * | 7/2000 | Tei et al. ...................... 372/32 |
| 6,754,415 B2 | * | 6/2004 | Shin et al. .................... 385/37 |

FOREIGN PATENT DOCUMENTS

| | | | |
|---|---|---|---|
| JP | A-54-103060 | 8/1979 | ............... 385/36 X |
| JP | A-5-102587 | 4/1993 | ............... 385/36 X |
| JP | A-2000-162516 | 6/2000 | ............... 385/88 X |
| JP | A-2000-321421 | 11/2000 | ............... 385/34 X |
| WO | WO-96-07114 | 3/1996 | ................. 385/140 |

* cited by examiner

Primary Examiner—Brian M. Healy
(74) Attorney, Agent, or Firm—Staas & Halsey LLP

(57) ABSTRACT

A movable mirror having a mirror surface reflecting a light input from an input fiber collimator is moved in an arrow (1) direction so that the reflection frequency of the input light reflected by an optical filter can be variable. The light is reflected plural times between the mirror surface and the optical filter, directed to a fixed mirror by the mirror surface, reflected by the fixed mirror, and is connected to an output fiber collimator. By moving the movable mirror in parallel, the reflection count of the light between the optical filter and the mirror surface is variable. Therefore, the wavelength characteristic of the light is obtained as an accumulated wavelength characteristic depending on the reflection count.

14 Claims, 46 Drawing Sheets

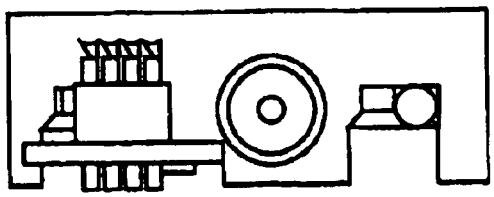
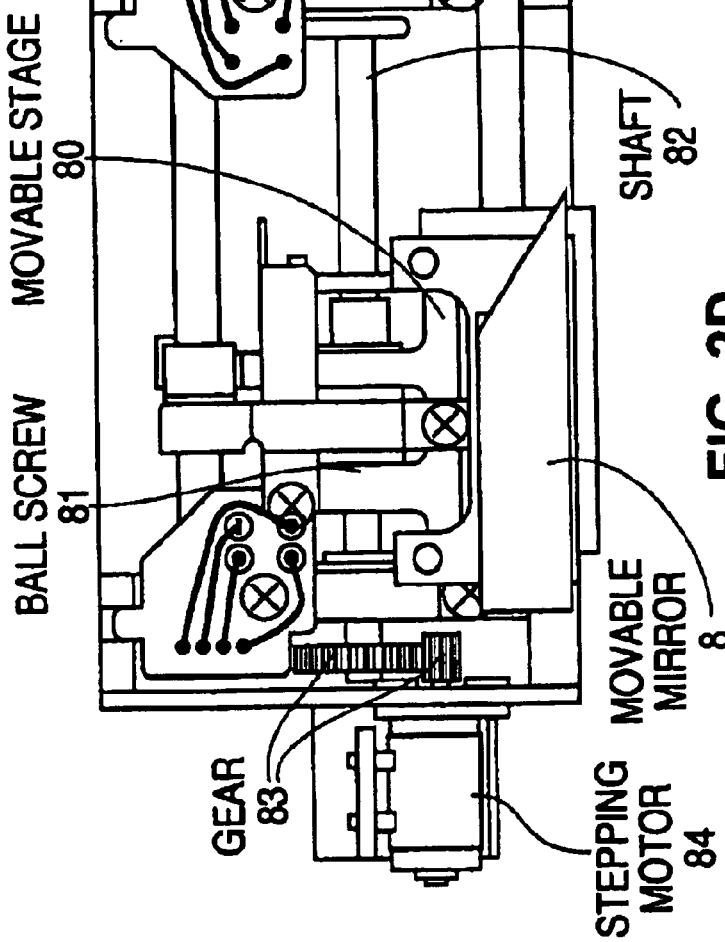
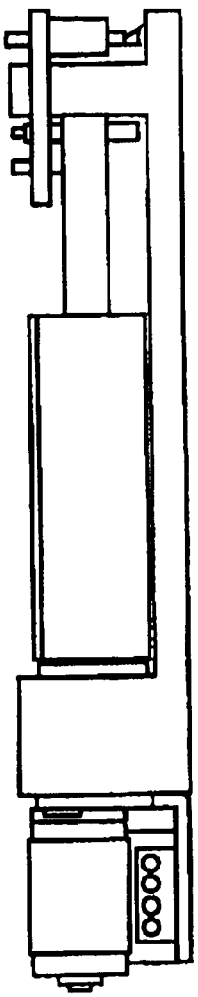
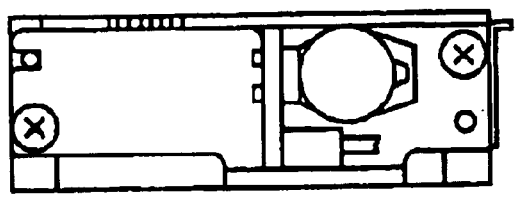

WAVELENGTH CHARACTERISTIC VARIABLE APPARATUS

BACKGROUND OF THE INVENTION

1. Field of the Invention

The present invention relates to a wavelength characteristic variable apparatus used to reduce the deviation of the signal strength of each wavelength caused in an optical fiber transmission line, an optical amplifier, etc. for use in a long distance wavelength-multiplexed transmission device.

2. Description of the Related Art

In a large capacity long distance transmission device, the number of optical amplification repeaters is increased, and a wavelength-multiplexed transmission system in which optical signals having different wavelengths are multiplexed to increase the transmission capacity is used.

In the wavelength-multiplexed transmission system, the deviation of the signal strength of each wavelength is very significant. That is, large deviation of a signal strength of each wavelength deteriorates the optical SNR in a receiver. Therefore, it is necessary to reduce the deviation of the signal strength of each wavelength. To reduce the deviation of the signal strength of each wavelength, a compensator having an inverse wavelength characteristic to offset the deviation of the signal strength of each wavelength is often used.

The deviation of the signal strength of each wavelength can be caused by, for example, the wavelength characteristic of the loss of a transmission line fiber by Rayleigh scattering and stimulated Raman scattering, the gain wavelength characteristic of an erbium-doped optical fiber amplifier (hereinafter referred to as an EDFA having an erbium-doped optical fiber as its amplifying medium hereinafter referred to as an EDF), etc. When the wavelength characteristic of the loss of the transmission line fiber is compensated for, a tilt compensator, etc. for compensation only for the tilt element is normally used with the linear wavelength characteristic taken into account. When the gain wavelength characteristic of the EDFA is compensated for, the wavelength characteristic is complicated in most cases. Therefore, a device referred to as a gain equalizer having a complicated wavelength characteristic is commonly used. The gain equalizer can be generated by, for example, the technology disclosed by Japanese Patent Publication No.10-285113 of generating a gain equalizer having an inverse wavelength characteristic to the gain wavelength characteristic by combining an etalon filter, etc.

However, the loss wavelength characteristic of a transmission line fiber depends on the type and length of fiber, the strength of a signal light, etc., and the gain wavelength characteristic of the EDFA depends on the composition of an EDF, the average inversion distribution coefficient in the longitudinal direction of the EDF, the length of the EDF, etc. Therefore, the deviation of the signal strength of each wavelength depends on the design of the transmission line and the EDFA. As a result, the wavelength characteristics of the necessary tilt compensator and gain equalizer are different from each other, and there are an enormous number of fixed compensators.

SUMMARY OF THE INVENTION

The present invention has been developed to solve the above mentioned problems, and aims at providing a wavelength characteristic variable apparatus capable of freely varying wavelength characteristics with a simple configuration of the apparatus.

The wavelength characteristic variable apparatus according to the present invention includes an optical filter unit having a desired wavelength characteristic, and a reflection unit capable of turning back an incident optical beam and varying the number of times the optical beam is input into the optical filter unit. By varying the number of times the optical beam is input into the optical filter unit, the wavelength characteristics can be effectively varied.

According to the present invention, a desired wavelength characteristic is assigned to an optical beam by inputting the optical beam into an optical filter unit formed by an optical filter having a desired transmission or reflection wavelength characteristic. Especially, by varying the number of times the optical beam is input into the optical filter unit, the wavelength characteristic assigned to the optical beam is accumulated, and the level of the wavelength characteristic of the optical filter unit can be varied. Furthermore, by providing a plurality of optical filters having different wavelength characteristics for an optical filter unit, the accumulated wavelength characteristics can be provided for the optical beam. Therefore, an optional wavelength characteristic can be logically assigned to the optical beam.

BRIEF DESCRIPTION OF THE DRAWINGS

FIGS. 2A–2D show different views of the drive mechanism;

DESCRIPTION OF THE PREFERRED EMBODIMENTS

The wavelength characteristic variable apparatus according to the present invention comprises at least a pair of input/output fibers, an optical filter having a desired wavelength characteristic, and a reflection element for turning back plural times an optical beam output from the fiber, and allowing the optical filter to input the optical beam plural times. With the configuration, it practically varies the wavelength characteristic by changing the number of times the optical beam is input into the optical filter.

According to the present invention, by changing the number of times an optical beam is input (transmitted or reflected) into an optical filter, the wavelength characteristic of the optical filter is accumulated and the wavelength characteristic can be changed stepwise.

The present invention can also comprise at least a pair of input/output fibers, an optical filter having a desired wavelength characteristic, a reflection element for turning back plural times an optical beam output from the fiber, and allowing the optical filter to input the optical beam plural times, and a reflection element provided to constantly maintain the optical path of the optical beam between the input/output fibers and a constant number of times the optical beam is reflected. With the configuration, it practically varies the wavelength characteristic by changing the number of times the optical beam is input into the optical filter while constantly maintaining the optical path of the optical beam and the reflection frequency.

With the configuration of the present invention, the optical path of the optical beam and the reflection frequency are constantly maintained independent of the entrance frequency, thereby keeping the excess loss unchanged.

Furthermore, according to the present invention, various configurations and embodiments can be realized, but the following embodiments are practically described below.

Figure 1:
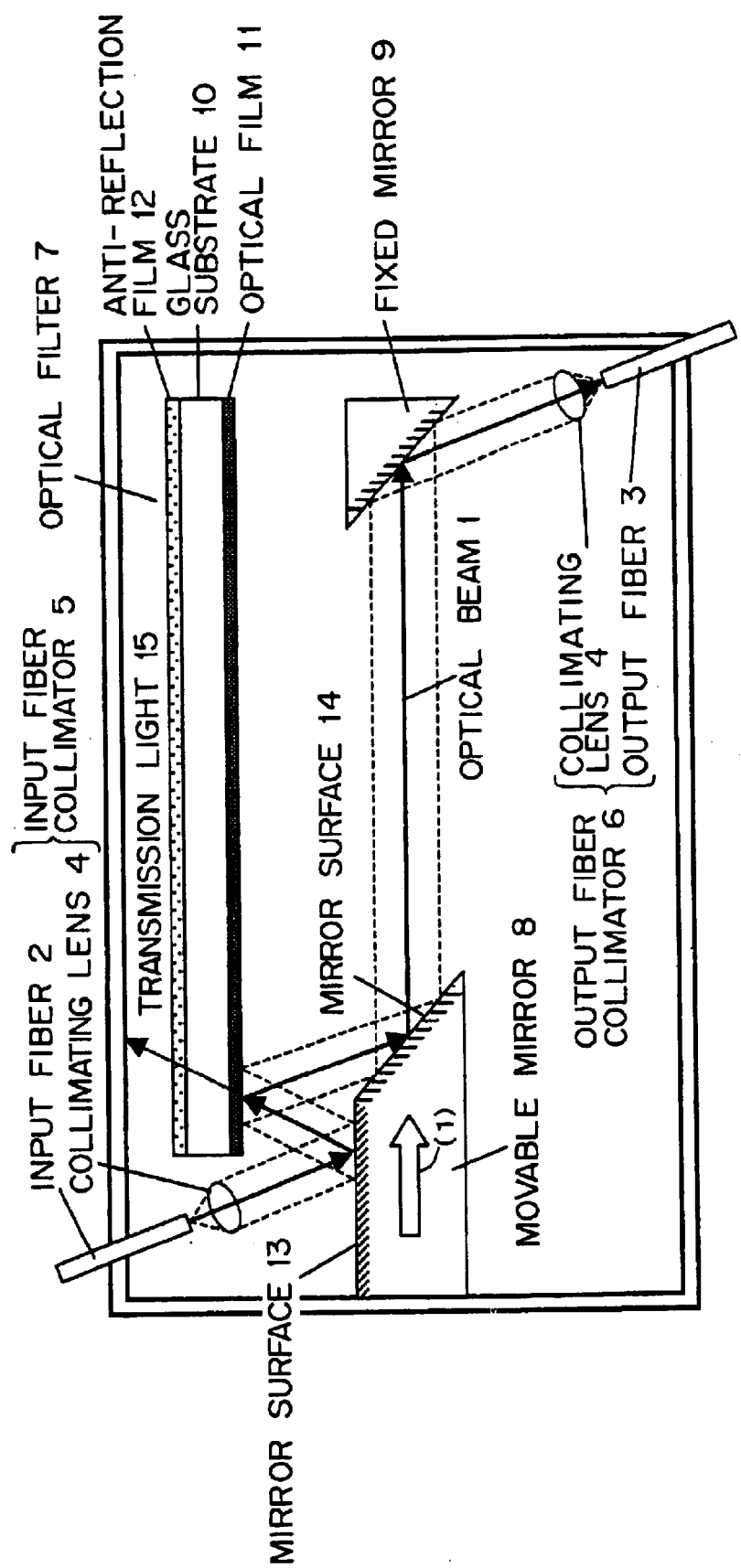
FIG. 1 shows the first embodiment of the present invention.

FIG. 1 shows the first embodiment of the present invention.

Shown in FIG. 1 are a pair of input/output fiber collimators 5 and 6 comprising input/output fibers 2 and 3 for generating substantially parallel optical beams 1, and a collimating lens 4, an optical filter 7 having a desired wavelength characteristic, and a reflecting and spatially movable mirror (hereinafter referred to as a movable mirror 8) for turning back the optical beam 1 plural times and inputting the optical beam 1 plural times into the optical filter 7. The outside frame is a metal housing provided with the above mentioned parts.

Figure 3:
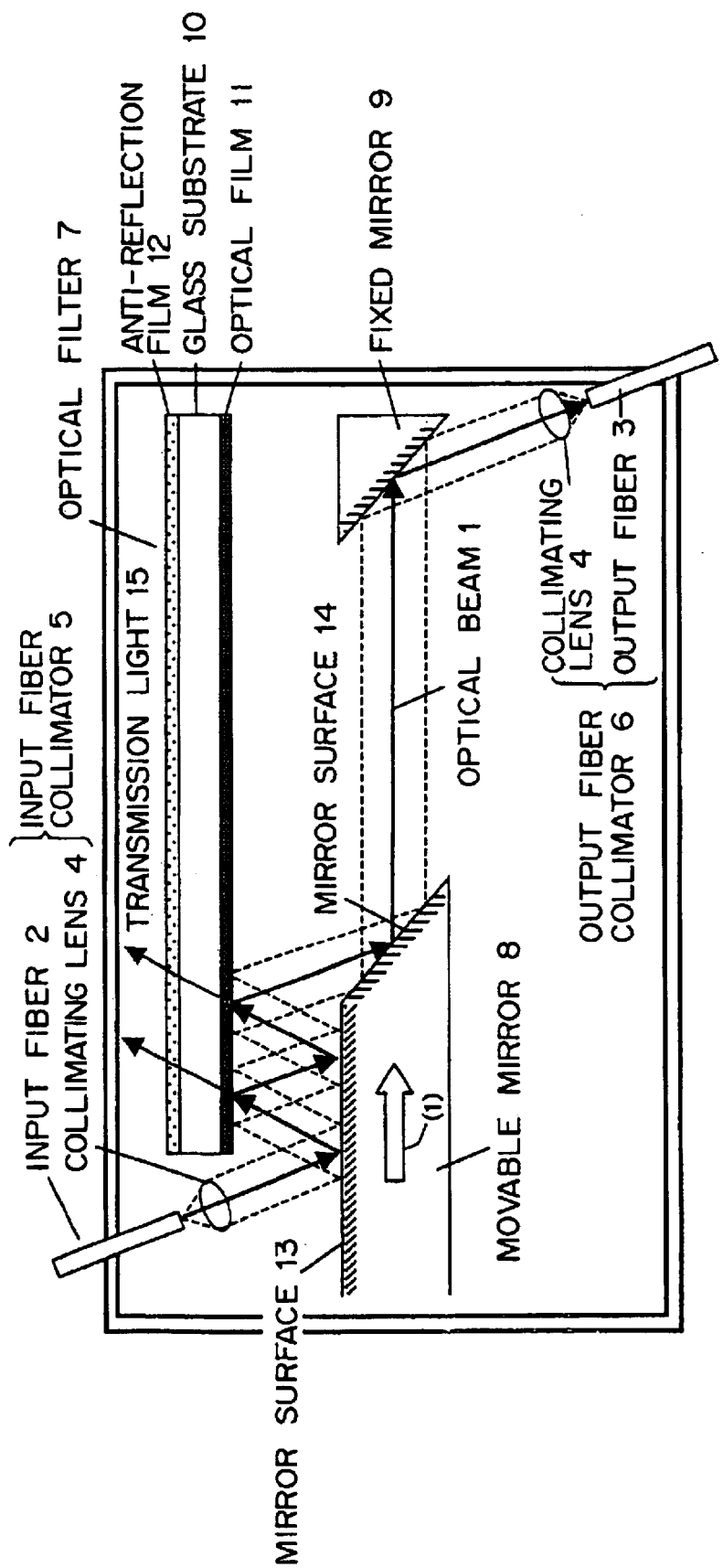
FIG. 3 shows the state in which the position of the movable mirror 8 is shifted by a beam space correctly in the arrow (1) direction with the configuration shown in FIG. 1.

The housing is not specifically shown, that is, omitted, in the attached drawings in and after FIG. 3.

According to the present embodiment, the optical path of the optical beam 1 is curved using a fixed mirror 9, which is not required. The optical filter 7 according to the present embodiment comprises an optical film 11 formed by a dielectric multilayer film on a glass substrate 10, and a anti-reflection film 12 is applied on the reverse side. The optical film 11 also functions as a reflecting optical filter having a desired reflection characteristic at a desired incident angle as described later. The movable mirror 8 has a mirror surface 13 and the mirror surface 14, and is mounted such that the mirror surface 13 can be correctly parallel to the surface of the optical film 11. The movable mirror is connected to a drive mechanism not shown in the attached drawings, and can be moved parallel to the mirror surface 13 (and the optical film 11) (in the arrow (1) direction) with precision of several μm.

FIGS. 2A–2D show different views of a drive mechanism.

The mirror 8 is mounted on a movable stage 80, and the movable stage 80 is connected to a shaft 82 through a ball screw 81. The shaft 82 is connected to a stepping motor 84 through two gears 83. By rotating the stepping motor 84, the shaft 82 rotates through the two gears 83, the rotating movement is converted into a horizontal movement by the ball screw 81, and the movable stage 80 is horizontally moved. Thus, the mirror 8 becomes movable, and can function as the movable mirror 8. The above mentioned drive mechanism can be realized in various configurations, and is not limited.

Back in FIG. 1, the path of the optical beam 1 is described below. The optical beam 1 output from the input fiber 2 is substantially paralleled by the collimating lens 4, and is then turned back by the mirror surface 13 of the movable mirror 8, and enters the optical film 11. Then, the optical beam 1 is reflected by the optical film 11, directed to the movable mirror 8 again, and is reflected by a mirror surface 14 of the movable mirror 8. The mirror surface 14 is designed to be inclined such that the optical beam 1 can be directed parallel to the mirror surface 13 (and the optical film 11). A transmission light 15 of the optical film 11 passes through the anti-reflection film 12 formed on the glass substrate 10 without reflection, and is discarded such that it cannot affect other portions. Finally, the optical path of the optical beam 1 is curved by the fixed mirror 9, the collimating lens 4 collects the beams again, and combines them into the output fiber 3.

It is necessary that the optical beam 1 reflected by the movable mirror 8 cannot overlap the optical beam 1 returned to the movable mirror 8. Therefore, the space (hereinafter referred to as a beam space) between the position of the optical beam 1 turned back from the mirror surface 13 and the position of the optical beam 1 reflected by the optical film 11 and returned to the movable mirror 8 again has to be equal to or larger than the diameter of the optical beam 1. For example, if the numerical aperture of the input/output fibers 2 and 3 is 0.1 approximately, and the focal distance of the collimating lens 4 is 1.8 m, then the beam diameter is 0.35 mm of the parallel optical beam 1. Assuming that the beam space is, for example, 0.5 mm, the angle (hereinafter referred to as an incident angle) between the optical beam 1 and the vertical line of the mirror surface 13 (and the optical film 11) can be about 5 degrees if the space between the mirror surface 13 of the movable mirror 8 and the optical film 11 is 3 mm, thereby determining the angle between the mirror surface 13 and the input fiber collimator 5. Furthermore, the incident angle of the optical beam 1 to the mirror surface 13 is equal to the incident angle to the optical film 11 because the mirror surface 13 is parallel to the optical film 11. As a result, it is necessary to design the optical film 11 to have a desired reflection characteristic at the incident angle.

In FIG. 1, the position of the movable mirror is set such that the number of times the optical beam 1 is reflected by the optical film 11 can be one, and the wavelength characteristic with the reflection of a fiber collimator and a mirror can be ignored. Therefore, the wavelength characteristic of the light output from the output fiber 3 is the same as the reflection wavelength characteristic of the optical film 11.

FIG. 3 shows the state in which the position of the movable mirror 8 is shifted by a beam space correctly in the arrow (1) direction with the configuration shown in FIG. 1.

In this state, the number of times the optical beam 1 is reflected by the optical film 11 is two, and the wavelength characteristic of the light output from the output fiber 3 is the characteristic obtained by two times accumulating the reflection wavelength characteristic of the optical film 11. At this time, since the moving direction of the movable mirror 8 is parallel to the mirror surface 13 (and the optical film 11), the optical beam 1 transmitting toward the fixed mirror 9 does not indicate an angle error although the movable mirror 8 is moved, thereby increasing the no coupling loss of the output fiber 3 by an angle error of the optical beam 1

As described above, by moving the position of the movable mirror 8 in the arrow (1) direction to maintain multiples of the beam space, the wavelength characteristic of the light output from the output fiber 3 can be changed stepwise such that the reflection wavelength characteristic of the optical film 11 can be accumulated.

The operation according to the present embodiment is described below by actually referring to the wavelength characteristic.

Figure 4:
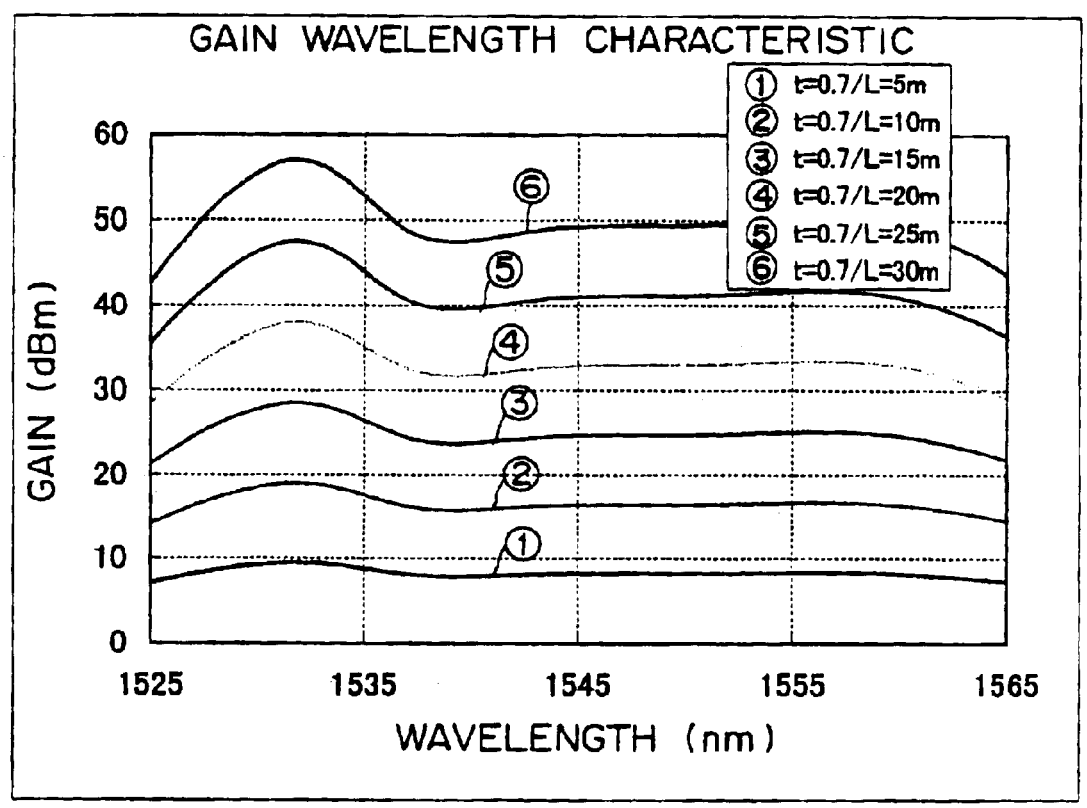
FIG. 4 shows an example of a gain wavelength characteristic of an EDFA.

FIG. 4 shows an example of the gain wavelength characteristic of the EDFA.

The gain wavelength characteristic $G(\lambda)$ of the EDFA is changed depending on the gain spectrum $g(\lambda)$ and the absorption spectrum $\alpha(\lambda)$ per unit length depending on the composition of the EDF, the input/output condition of the EDFA, that is, the average inversion population coefficient in the longitudinal direction of the EDF depending on the input level, the output of the excitation light, etc. the length L of the EDF, etc. as shown by equation 1.

$$G(\lambda)=\{t \times g(\lambda)-(1-t) \times \alpha(\lambda)\} \times L \qquad \text{equation (1)}$$

where $G(\lambda)$ indicates the gain (dB); t indicates the average inversion population coefficient in the longitudinal direction of EDF ($0 \leq t \leq 1$); L indicates the length (m) of EDF; $g(\lambda)$ indicates the gain spectrum (dB/m) per unit length; and $\alpha(\lambda)$ indicating the absorption spectrum (db/m) per unit length.

FIG. 4 shows the gain wavelength characteristic obtained when the length L of the EDF changes (L=5 through 30 m) with the average inversion population coefficient t set constant (t=0.7). Since the gain $G(\lambda)$ in dB is proportional to the length L of the EDF, the gain $G(\lambda)$ in dB doubles when the length L of the EDF doubles.

Figure 5:
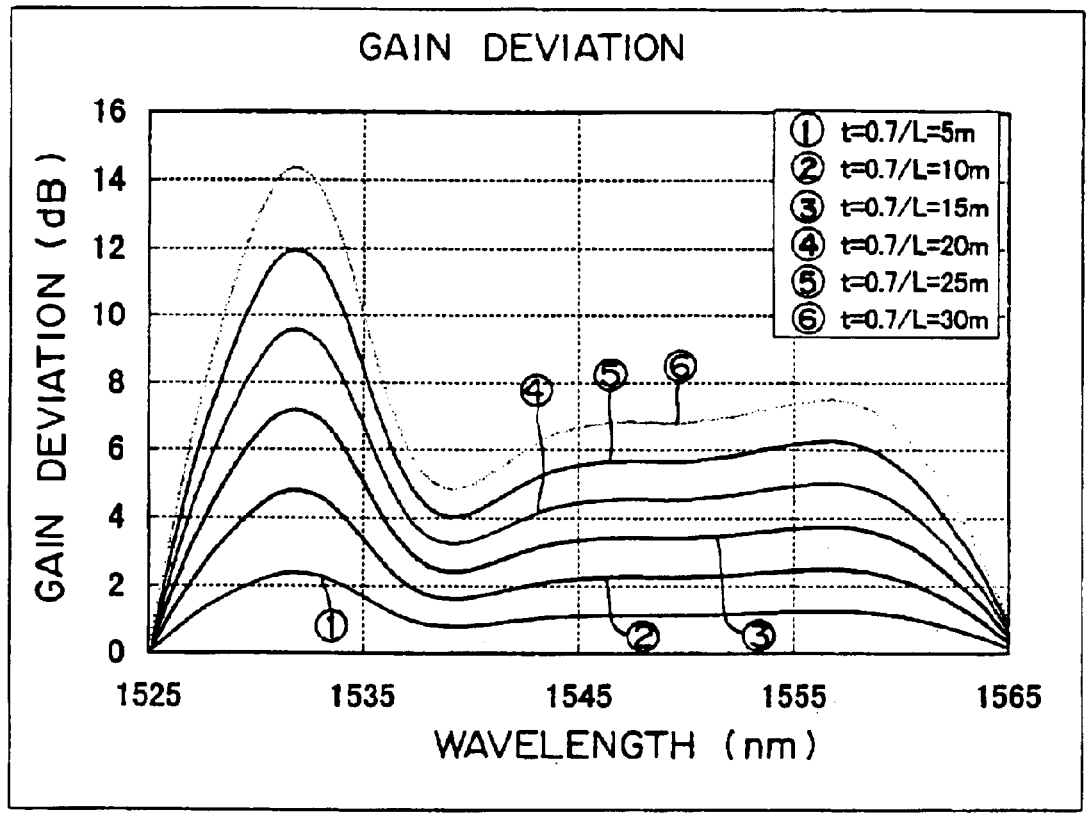
FIG. 5 shows a gain deviation in the wavelength range from 1525 to 1565 nm.

FIG. 5 shows the gain deviation in the wavelength range from 1525 to 1565 nm. The gain deviation is the ratio of the gain of a wavelength to the gain of 1525 nm. If there is a gain equalizer having a loss wavelength characteristic offsetting the wavelength characteristic of the gain deviation, then the gain deviation can be removed.

Figure 6:
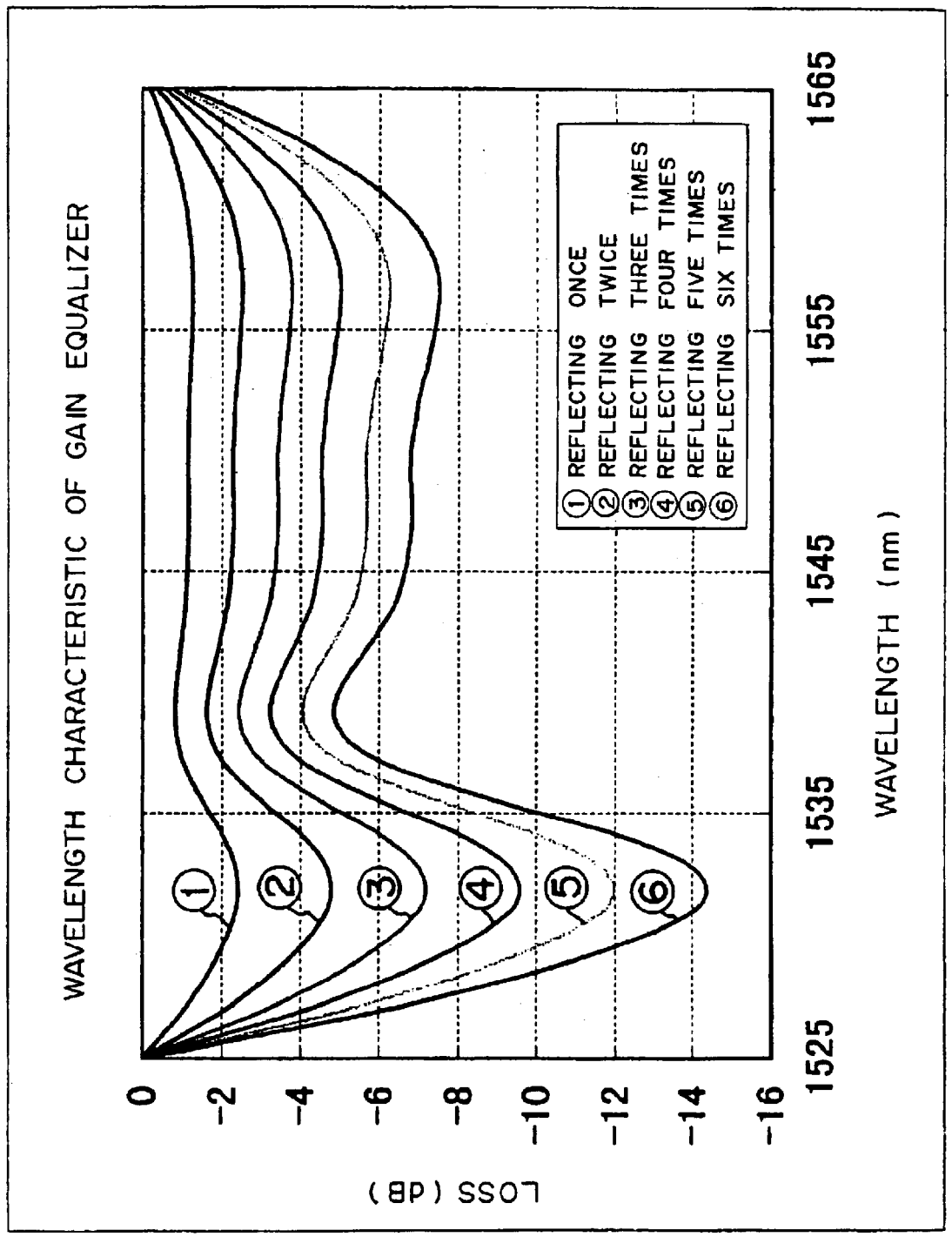
FIG. 6 shows the wavelength characteristic of a gain equalizer.

FIG. 6 shows the wavelength characteristic of a gain equalizer.

For example, the optical film 11 according to the present embodiment is designed to have an inverse reflection wavelength characteristic at a predetermined incident angle to the characteristic obtained when the length L of the EDF is 5 m as shown in FIG. 5, and the position of the movable mirror 8 is moved as described above, thereby changing stepwise the wavelength characteristic of the wavelength characteristic variable apparatus according to the present embodiment as shown in FIG. 6.

Figure 7:
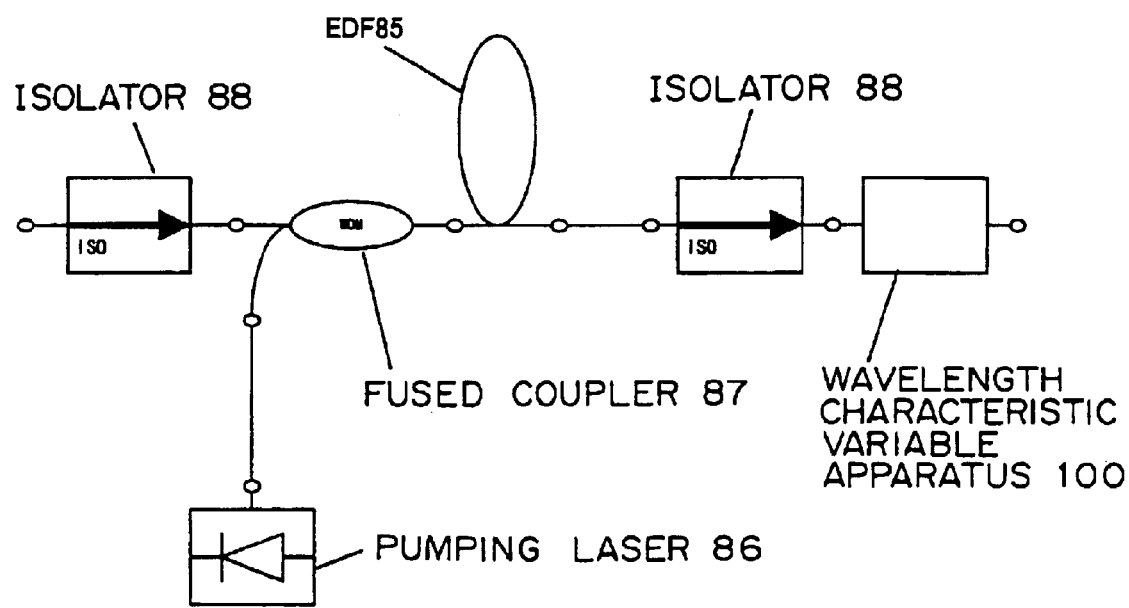
FIG. 7 shows an example of an EDFA with the wavelength characteristic variable apparatus according to the first embodiment mounted as a gain equalizer.

FIG. 7 shows an example of the EDFA using the wavelength characteristic variable apparatus as a gain equalizer.

In FIG. 7, the EDFA comprises an EDF 85, a pumping laser 86 for exciting the EDF 85, a fused coupler 87 for introducing the pumping light from the pumping laser 86 to the EDF 85, and two isolators 88 provided to avoid the oscillation in the EDF 85.

A wavelength characteristic variable apparatus 100 according to the present embodiment is connected to the EDFA, and functions as a gain equalizer.

Figure 8:
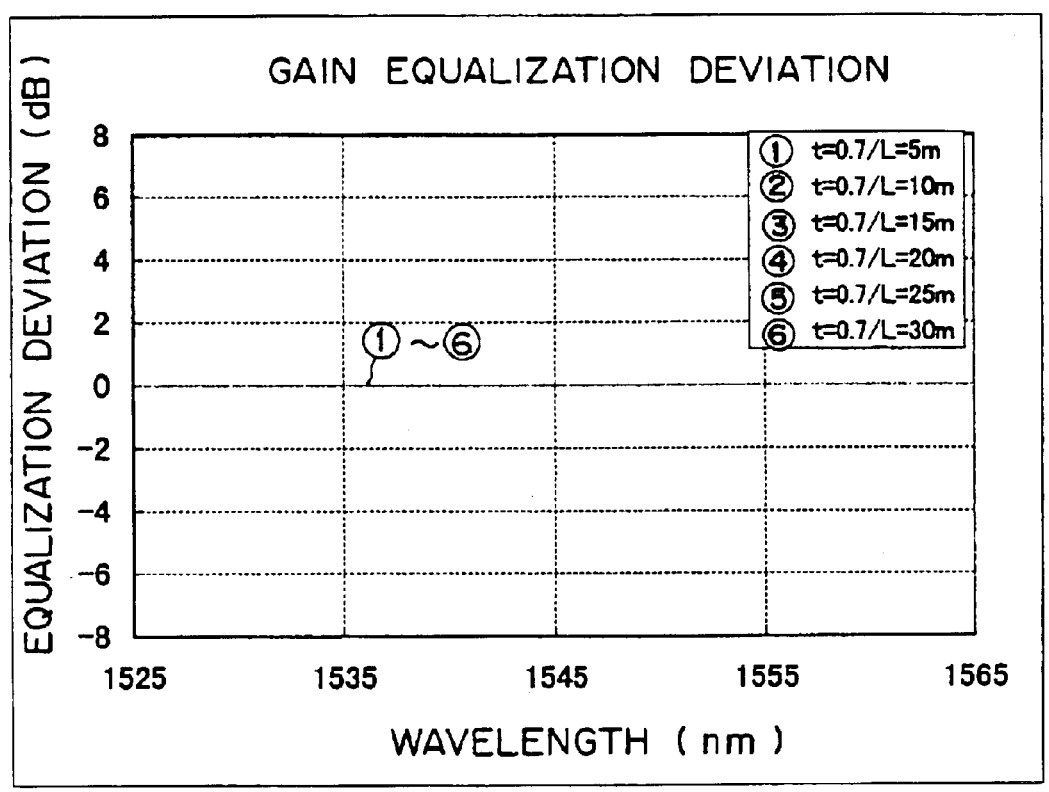
FIG. 8 shows the operation of the wavelength characteristic variable apparatus according to the first embodiment as a gain equalizer.

FIG. 8 shows the operation as a gain equalizer of the wavelength characteristic variable apparatus according to the present embodiment.

As shown in FIG. 7, when the wavelength characteristic variable apparatus 100 of the present embodiment is connected to the EDFA as a gain equalizer, an EDFA having a length (5 m in this case) of the EDF different from the length shown in FIG. 8 can also set the gain equalization deviation of substantially 0. Furthermore, if the gain equalized optical amplifier is mounted in the wavelength transmission device, a transmission device indicating little deviation and deterioration of an optical SNR. When the length of an EDF is to be designed in a smaller unit, the optical film 11 is designed such that an inverse reflection wavelength characteristic can be obtained to the gain wavelength characteristic in the smallest unit, and the length of the optical film 11 and the movable distance of the movable mirror 8 are set longer so that the reflection frequency can be enhanced.

In the second embodiment, an example of compensating for the linear wavelength characteristic of a transmission line fiber is described. The configuration according to the present embodiment is the same as the configuration according to the first embodiment except the optical film 11.

Figure 9:
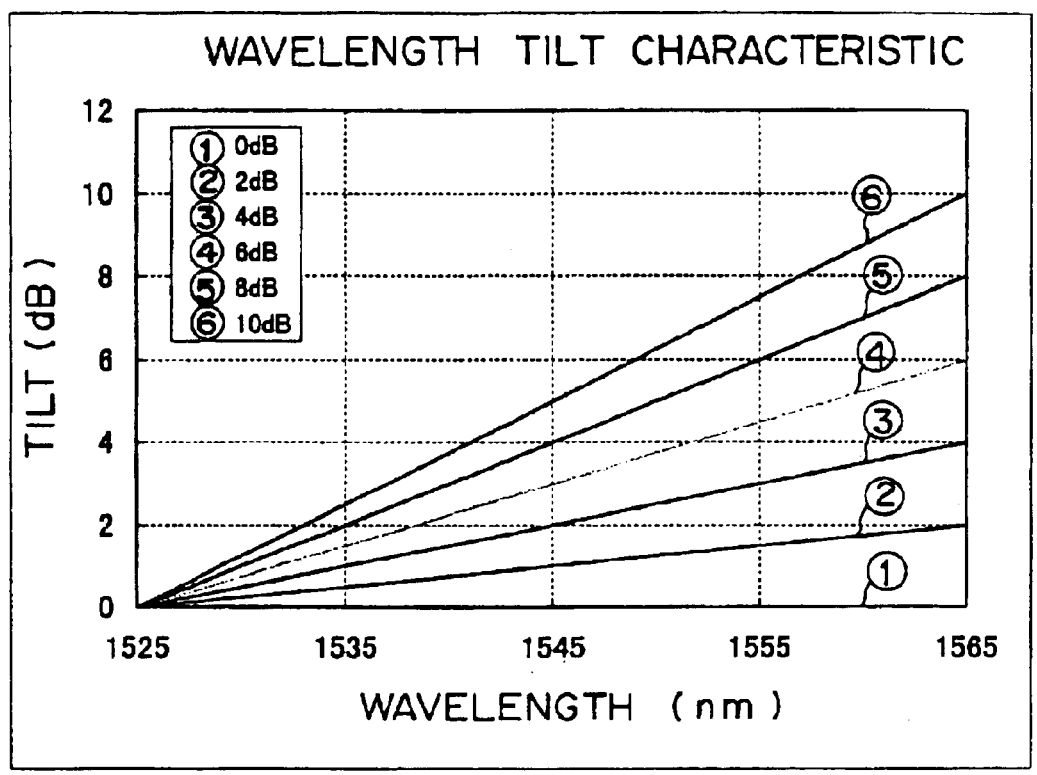
FIG. 9 shows an example of a linear wavelength characteristic of a transmission line fiber.
Figure 10:
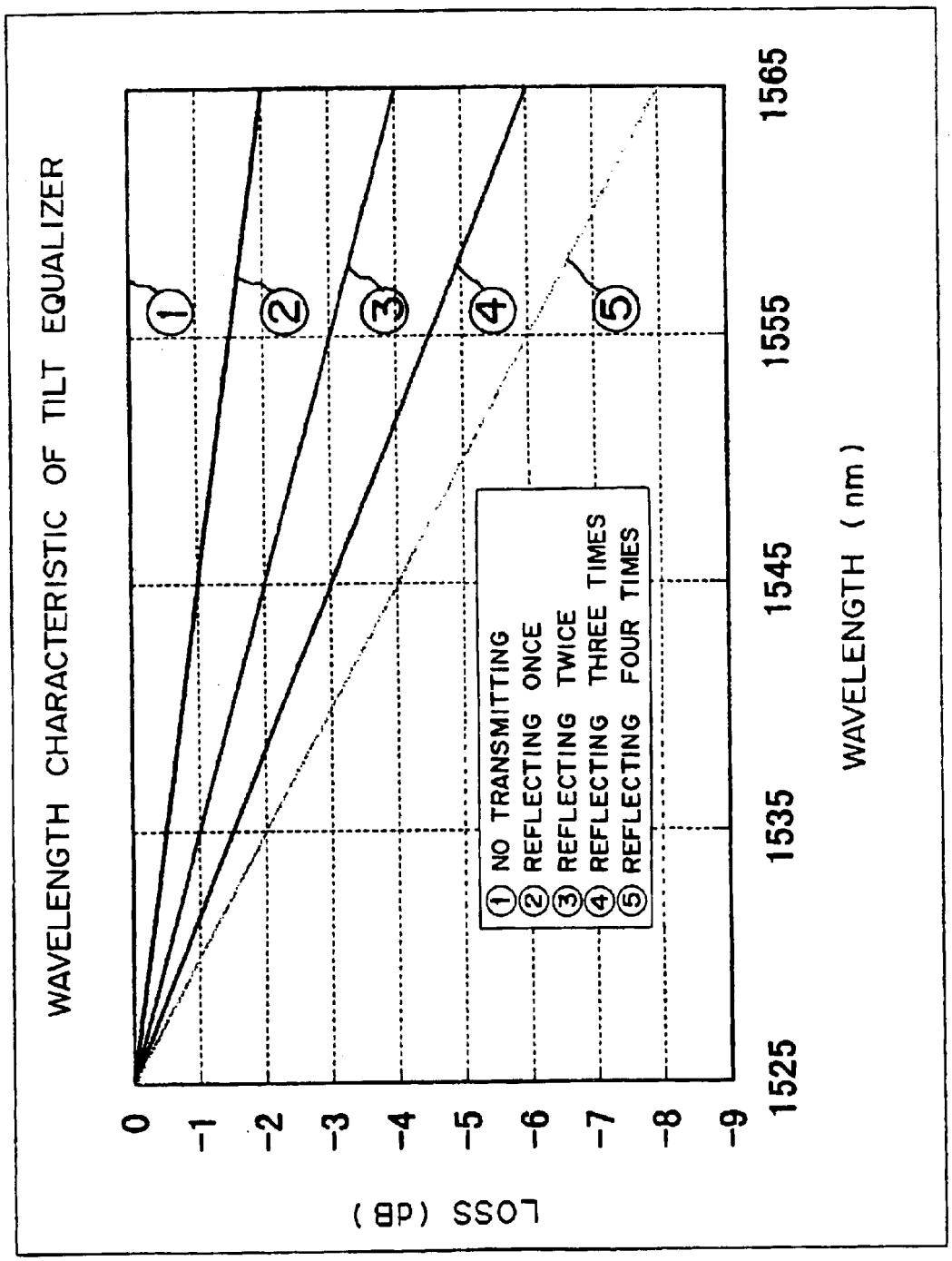
FIG. 10 shows the wavelength characteristic of a tilt equalizer.
Figure 11:
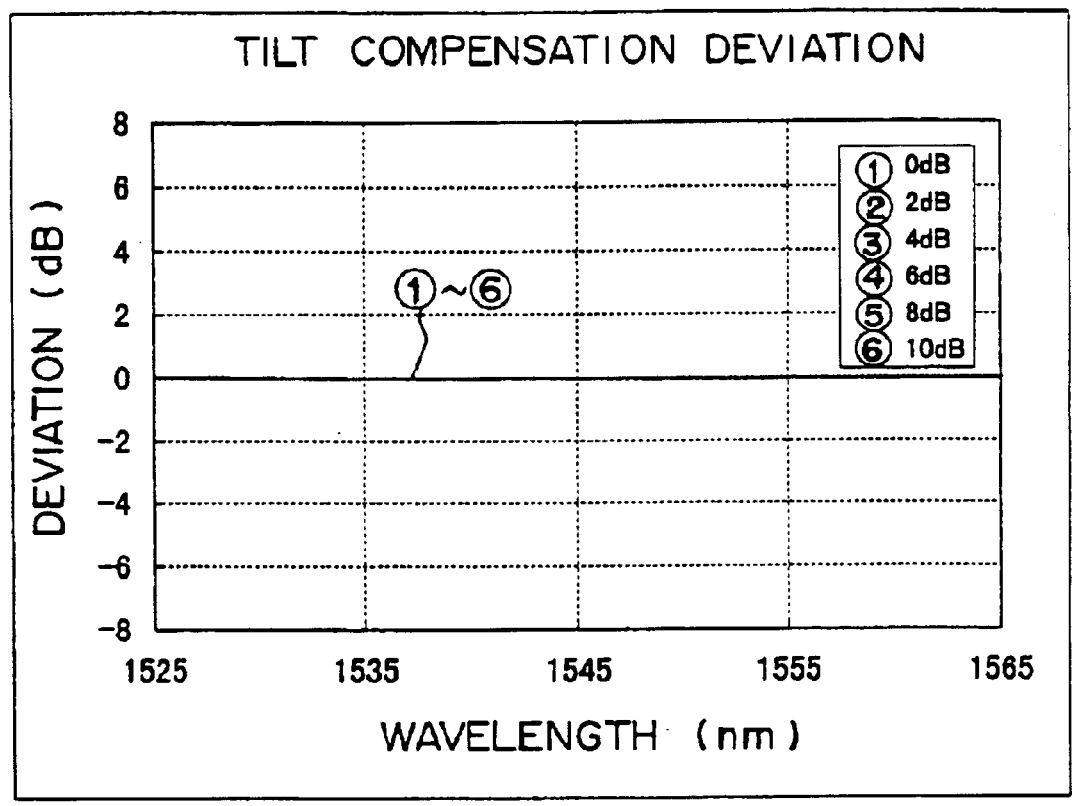
FIG. 11 shows the deviation of the tilt compensation as a result of compensating for the wavelength tilt characteristic using a tilt equalizer shown in FIG. 10.

FIG. 9 shows an example of the linear wavelength characteristic of a transmission line fiber. FIG. 10 shows the wavelength characteristic of a tilt equalizer. FIG. 11 shows the tilt compensation deviation as a result of the tilt equalizer shown in FIG. 10 compensating for the wavelength tilt characteristic shown in FIG. 9.

A maximum of 10 dB of a wavelength tilt is detected in the wavelength range from 1525 to 1565 nm depending on the length of fiber. If the optical film 11 according to the present embodiment is designed to have an inverse reflection wavelength characteristic to the wavelength tilt of 2 dB at a predetermined incident angle, and the position of the movable mirror 8 is moved as in the first embodiment, then the wavelength characteristic of the wavelength characteristic variable apparatus according to the present embodiment as a tilt equalizer can be stepwise changed as shown in FIG. 10.

If the wavelength characteristic variable apparatus according to the present embodiment is connected as a tilt compensator to the transmission line fiber, the tilt compensation deviation can be set to substantially zero although the wavelength tilt has a different transmission line (in 2 dB unit in this case) as shown in FIG. 11. If the tilt compensated transmission line fiber is applied to a wavelength transmission device, then a transmitting process can be performed with little signal strength deviation and deterioration of an optical SNR.

According to the above mentioned embodiment, an optical film is used as a reflecting type optical filter, but a transmission type optical filter can also be used.

Figure 12:
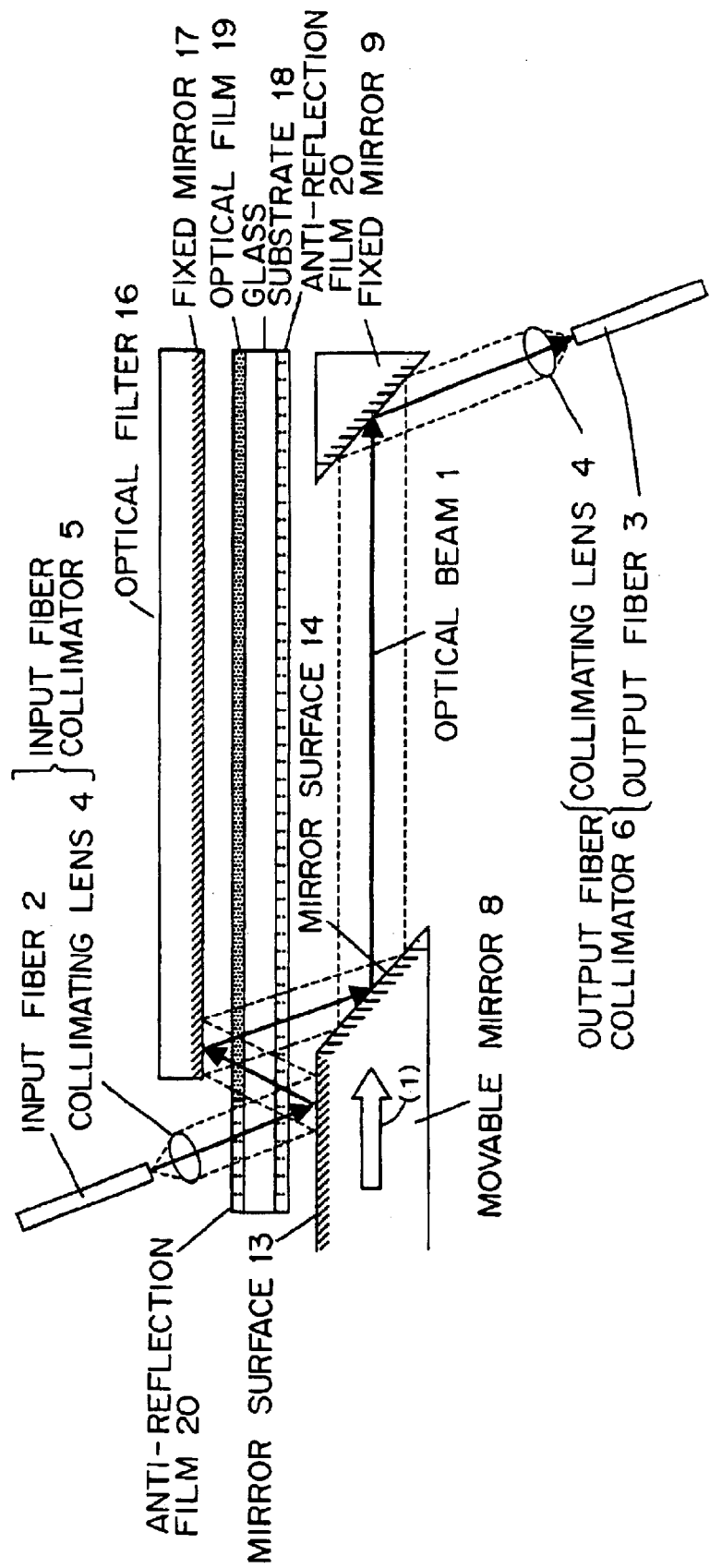
FIG. 12 shows the configuration (1) according to the third embodiment of the present invention.
Figure 13:
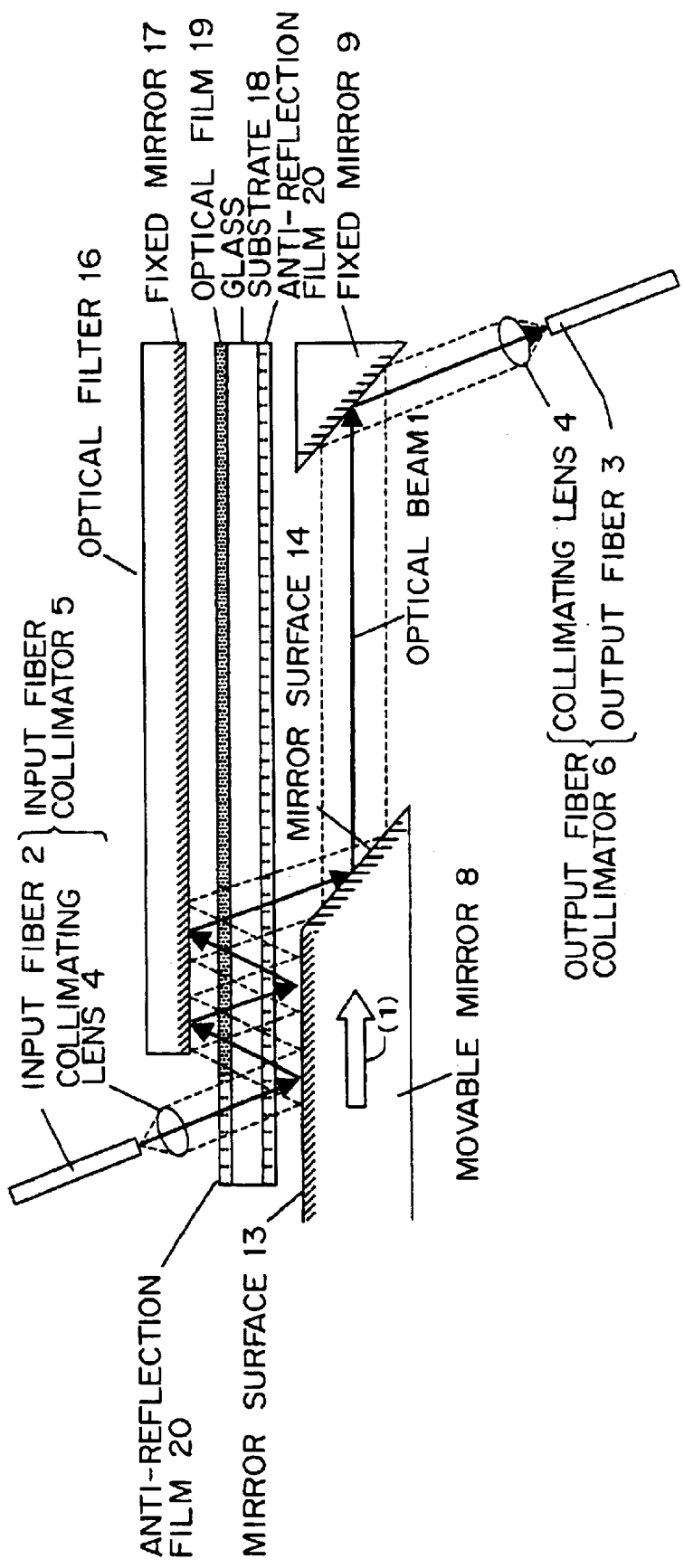
FIG. 13 shows the configuration (2) according to the third embodiment of the present invention.
Figure 14:
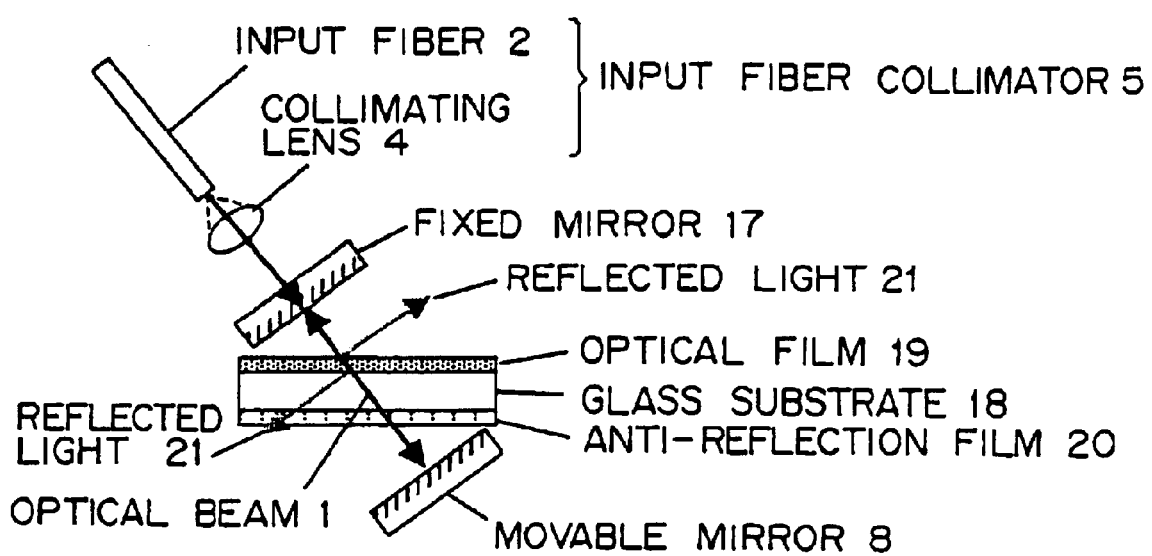
FIG. 14 shows the configuration (3) according to the third embodiment of the present invention.

FIGS. 12 through 14 shows the configuration of the third embodiment of the present invention.

The third embodiment is different from the first embodiment in the following points.

According to the third embodiment, a transmission type optical filter 16 having a predetermined transmission wavelength characteristic is used, and a fixed reflecting mirror 17 is provided correctly parallel to the movable mirror 8 to turning back the optical beam 1 which transmits the optical filter 16 to the movable mirror 8. According to the present embodiment, an optical film 19 of a dielectric multilayer film formed on a glass substrate 18 is used as a transmission type optical filter 16, and an anti-reflection film 20 is applied onto the reverse side. In an area where the optical beam 1 output from the input fiber collimator 5 first enters an optical filter, the anti-reflection film 20 is formed instead of the optical film 19.

In FIG. 12, the optical beam 1 output from the input fiber 2 is substantially paralleled by the collimating lens 4, passes through the optical filter 16 without reflection by the anti-reflection film 20, is turned back by the mirror surface 13 of the movable mirror 8, passes through the anti-reflection film 20 again, and enters the optical film 19. Then, the optical beam 1 passes through the optical film 19, is reflected by the reflecting mirror 17, passes through the optical film 19 again, is directed to the movable mirror 8, and is reflected by the mirror surface 14 of the movable mirror 8. Then, as in the first embodiment, the optical path of the optical beam 1 is curved by the fixed mirror 9, collected by the collimating lens 4 again, and is converged as the output fiber 3. Thus, according to the present embodiment, the optical beam 1 passes through the optical film 19 twice to turn back the optical beam 1 on the movable mirror 8.

If the mirror surface 13 of the movable mirror 8 and the reflecting mirror 17 is set to be parallel to the surface of the optical film 19, the light reflected by the optical film 19 overlaps the transmission light through the optical film 19, and is input into the output fiber, thereby affecting the wavelength characteristic. Therefore, as shown in FIG. 14 viewed in the moving direction of the movable mirror (in the arrow (1) direction, that is, in FIG. 14, the optical beam 1 passes in the depth direction of the sheet of FIG. 14), by setting the optical film 19 inclined as viewed from the moving direction of the movable mirror such that the surface of the optical film 19 cannot be parallel to the mirror surface 13 of the movable mirror 8 and the reflecting mirror 17, which are provided on both sides of the optical film 19, a light 21 reflected by the transmission type optical film 19 makes an angle different from an angle made by the transmission light of the optical film 19, and the light reflected by the transmission type optical filter cannot enter the output fiber.

FIG. 13 shows the state in which the position of the movable mirror 8 is moved by the beam space correctly in the arrow direction with the configuration shown in FIG. 12. In this state, the optical beam 1 passes through the optical film 19 four times. Therefore, the wavelength characteristic of the light output from the output fiber 3 is the characteristic obtained by accumulating four times the reflection wavelength characteristic of the optical film 19. As described above, although the transmission type optical filter 16 is used as in the present embodiment, the wavelength characteristic of the light output from the output fiber 3 can be stepwise changed as if the transmission wavelength characteristic of the optical filter 16 were accumulated by moving the position of the movable mirror 8 in the arrow (1) direction by multiples of beam spaces.

The effect of the present embodiment is described below actually by referring to the wavelength characteristic.

Figure 15:
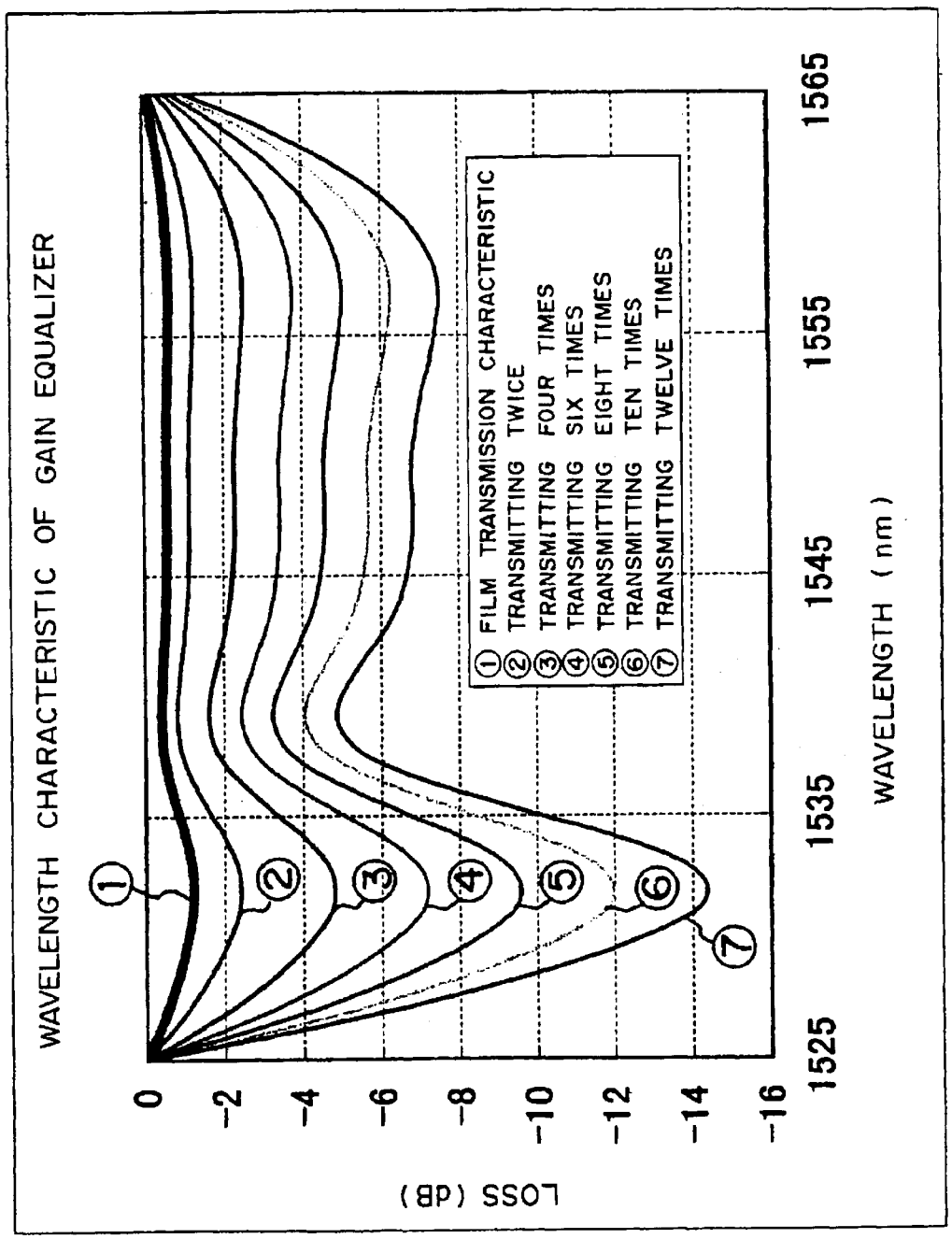
FIG. 15 shows the wavelength characteristic of the wavelength characteristic variable apparatus according to the third embodiment of the present invention.

FIG. 15 shows the wavelength characteristic of the wavelength characteristic variable apparatus according to the present embodiment. As in the first embodiment, although a different length of the EDF is used in the EDFA, a gain equalizer can equalize the gain wavelength characteristic. According to the present embodiment, the EDFA in the first embodiment is also used. However, if the optical film 19 is designed to have an inverse transmission wavelength characteristic to the gain wavelength characteristic of the half the gain deviation (that is, L=2.5 m) when the length L of the EDF is 5 m as shown in FIG. 5, then the wavelength characteristic of the wavelength characteristic variable apparatus according to the present embodiment can be stepwise changed as shown in FIG. 15 by moving the position of the movable mirror 8 as described above.

Figure 16:
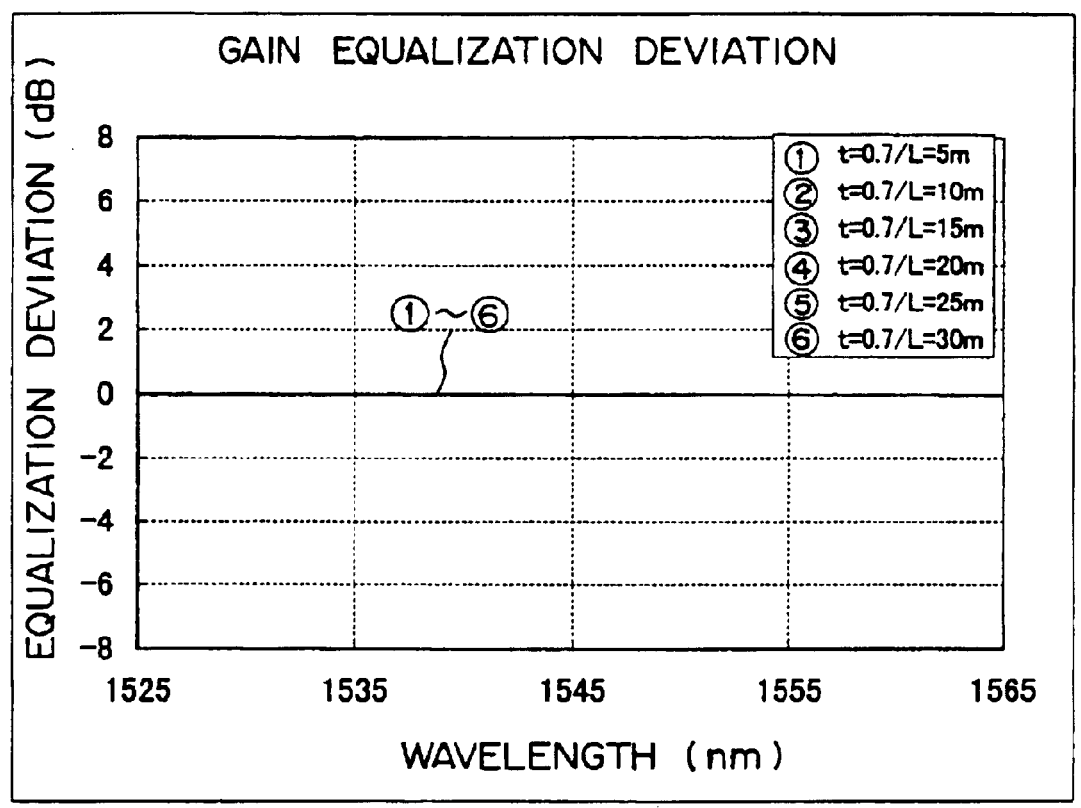
FIG. 16 shows the gain equalization deviation according to the third embodiment of the present invention.

FIG. 16 shows the gain equalization deviation according to the third embodiment of the present invention.

If the wavelength characteristic variable apparatus according to the present embodiment is connected as a gain equalizer to the same EDFA as in the first embodiment of the present invention, then the gain equalization deviation can be set substantially to zero although the EDFA has a different length (5 m unit in this case) of the EDF as shown in FIG. 16.

Described above is the embodiment in which a single wavelength characteristic variable apparatus is used, but a plurality of wavelength characteristic variable apparatuses can be connected in series to combine a plurality of wavelength characteristics and complicatedly change a wavelength characteristic. That is, the output fiber of the first wavelength characteristic variable apparatus can be connected to the input fiber of the second wavelength characteristic variable apparatus using a splice, etc., but it can be connected through an optical beam. According to the fourth embodiment, they are connected to each other trough an optical beam.

Figure 17:
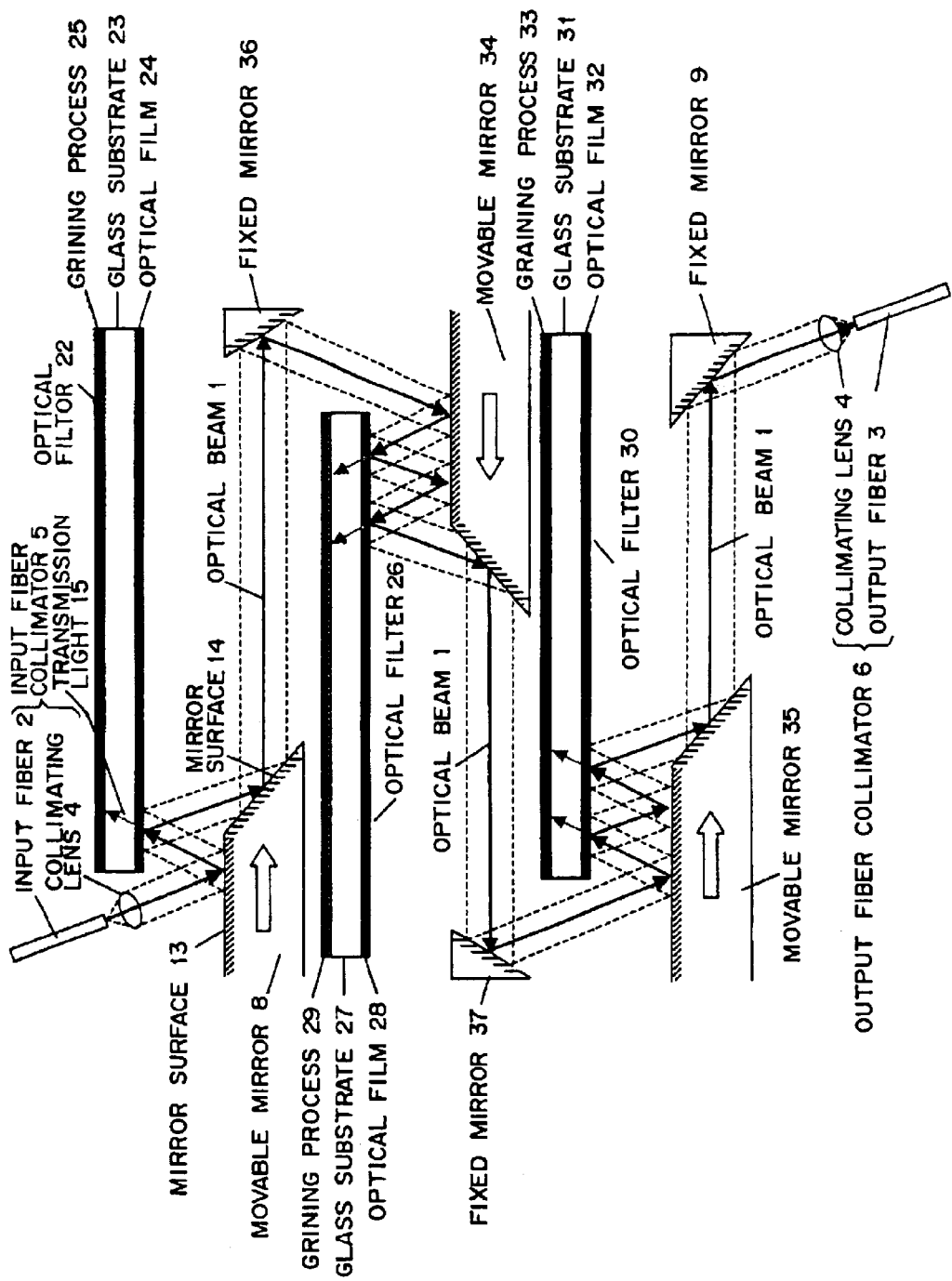
FIG. 17 shows the apparatus obtained by connecting three stages of the wavelength characteristic variable apparatuses according to the first embodiment through an optical beam according to the fourth embodiment of the present invention.
Figure 18:
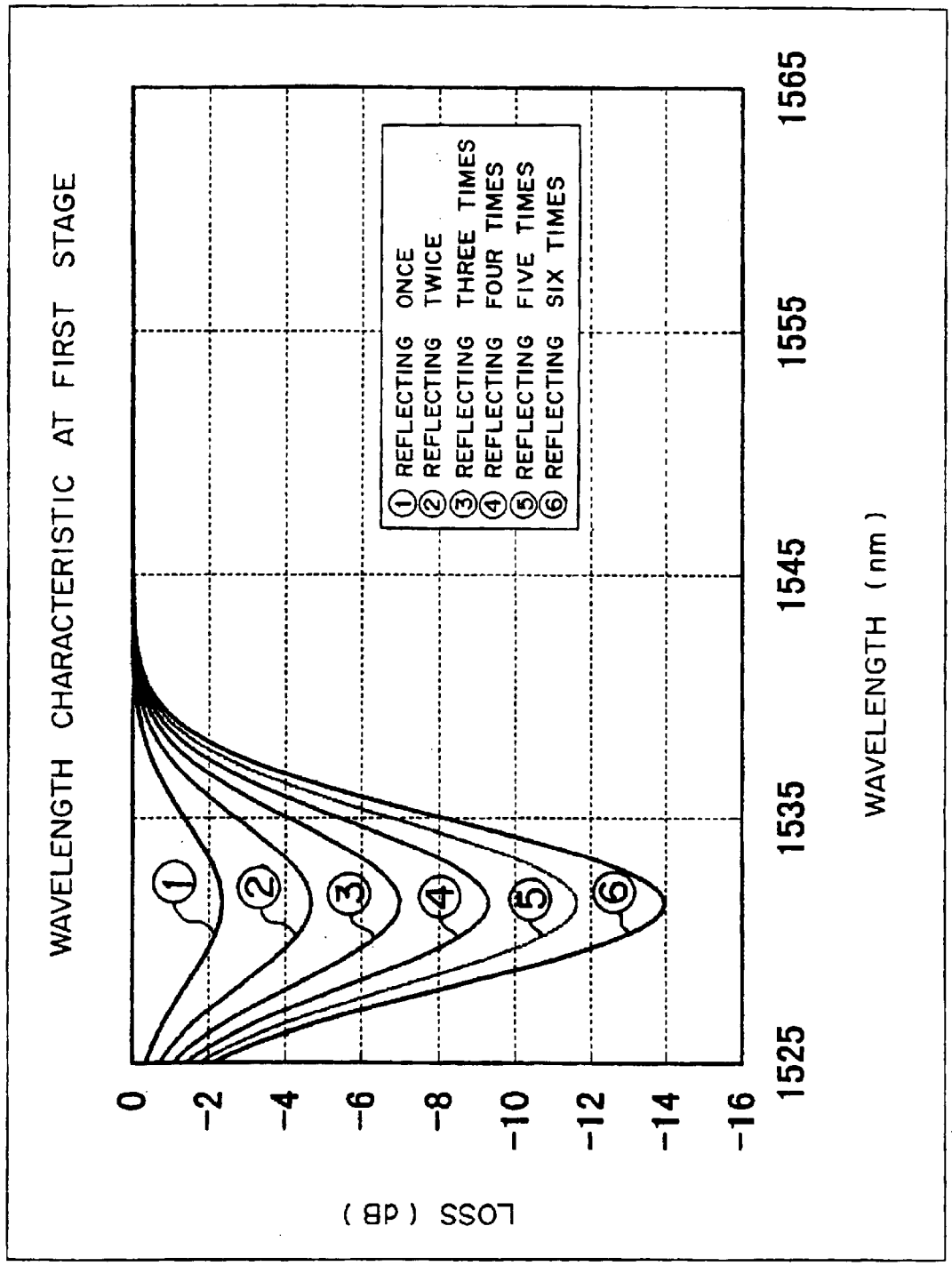
FIG. 18 shows the wavelength characteristic (1) of each stage according to the fourth embodiment of the present invention.
Figure 19:
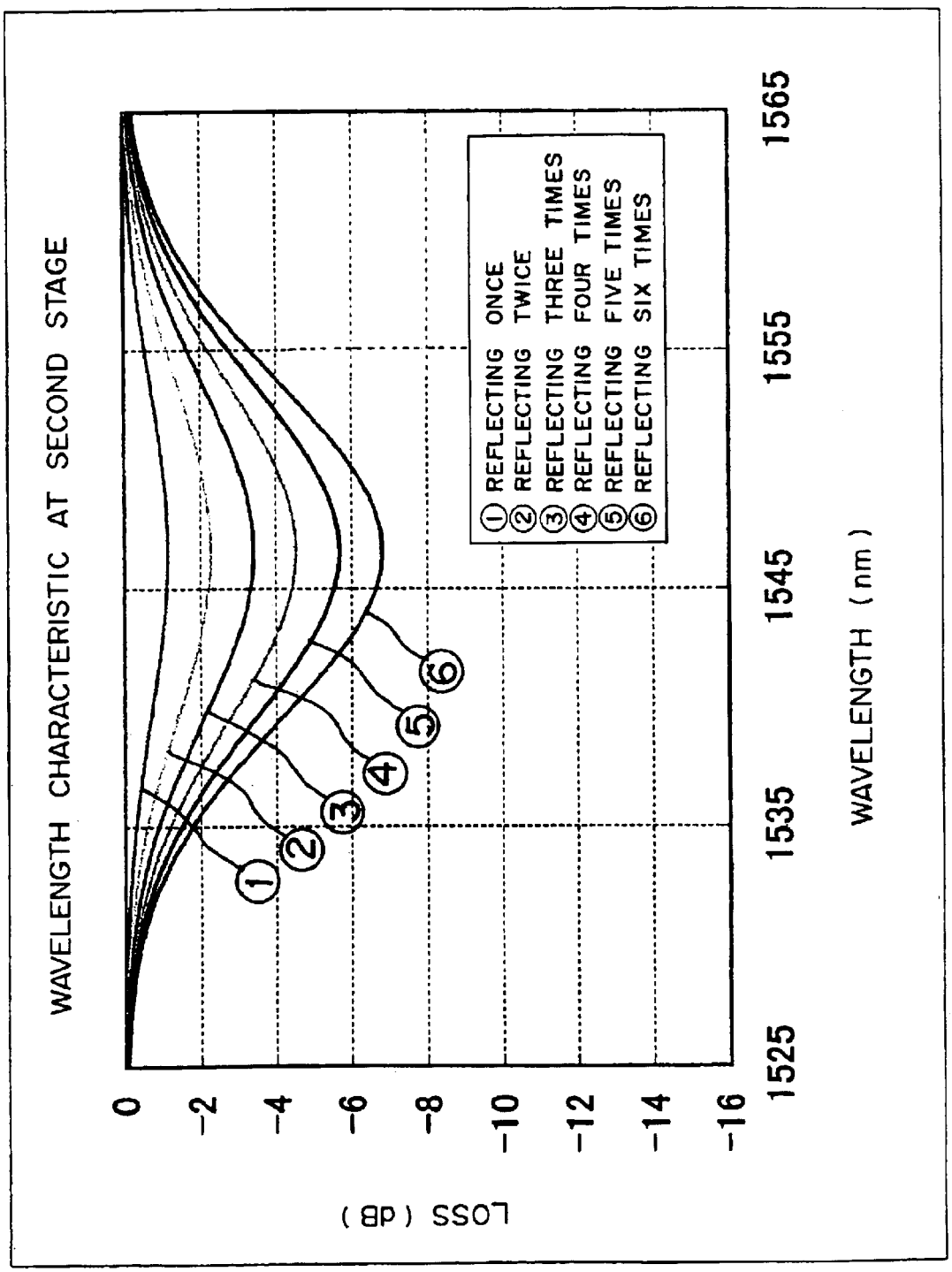
FIG. 19 shows the wavelength characteristic (2) of each stage according to the fourth embodiment of the present invention.
Figure 20:
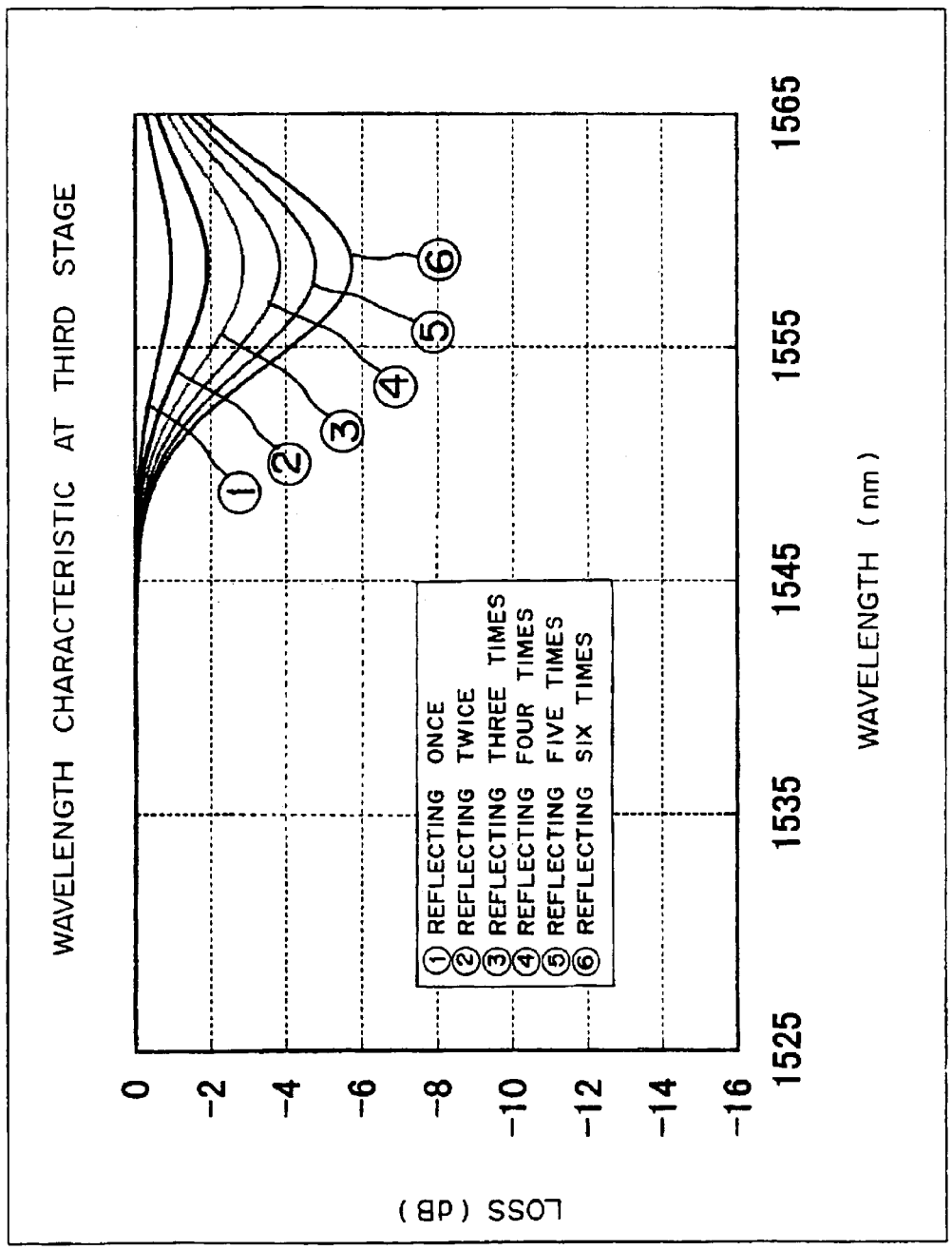
FIG. 20 shows the wavelength characteristic (3) of each stage according to the fourth embodiment of the present invention.

FIG. 17 shows the three stages of the wavelength characteristic variable apparatuses according to the first embodiment are connected through an optical beam according to the fourth embodiment of the present invention. FIGS. 18 through 20 show the wavelength characteristics at each stage according to the fourth embodiment of the present invention.

The present embodiment is different from the first embodiment in optical filters 22, 26, and 30 which are reflecting optical filters whose optical filters 24, 28, and 32 respectively formed on glass substrates 23, 27, and 31 have desired reflection characteristics with the transmission light scattered on the reverse sides, and with graining processes 25, 29, and 33 performed to suppress reflection.

The reflection wavelength characteristics of the optical filters 22, 26, and 30 according to the present embodiment are equal to the single reflection shown in FIGS. 18, 19, and 20, that is, the wavelength characteristics of a simple single peak. As in the first embodiment, the positions of the movable mirrors 8, 34, and 35 are moved, and the reflection frequency of the optical filters 24, 28, and 32 is changed, thereby stepwise changing the wavelength characteristic of each stage of the wavelength characteristic variable apparatus as shown in FIGS. 18, 19, and 20.

Figure 21:
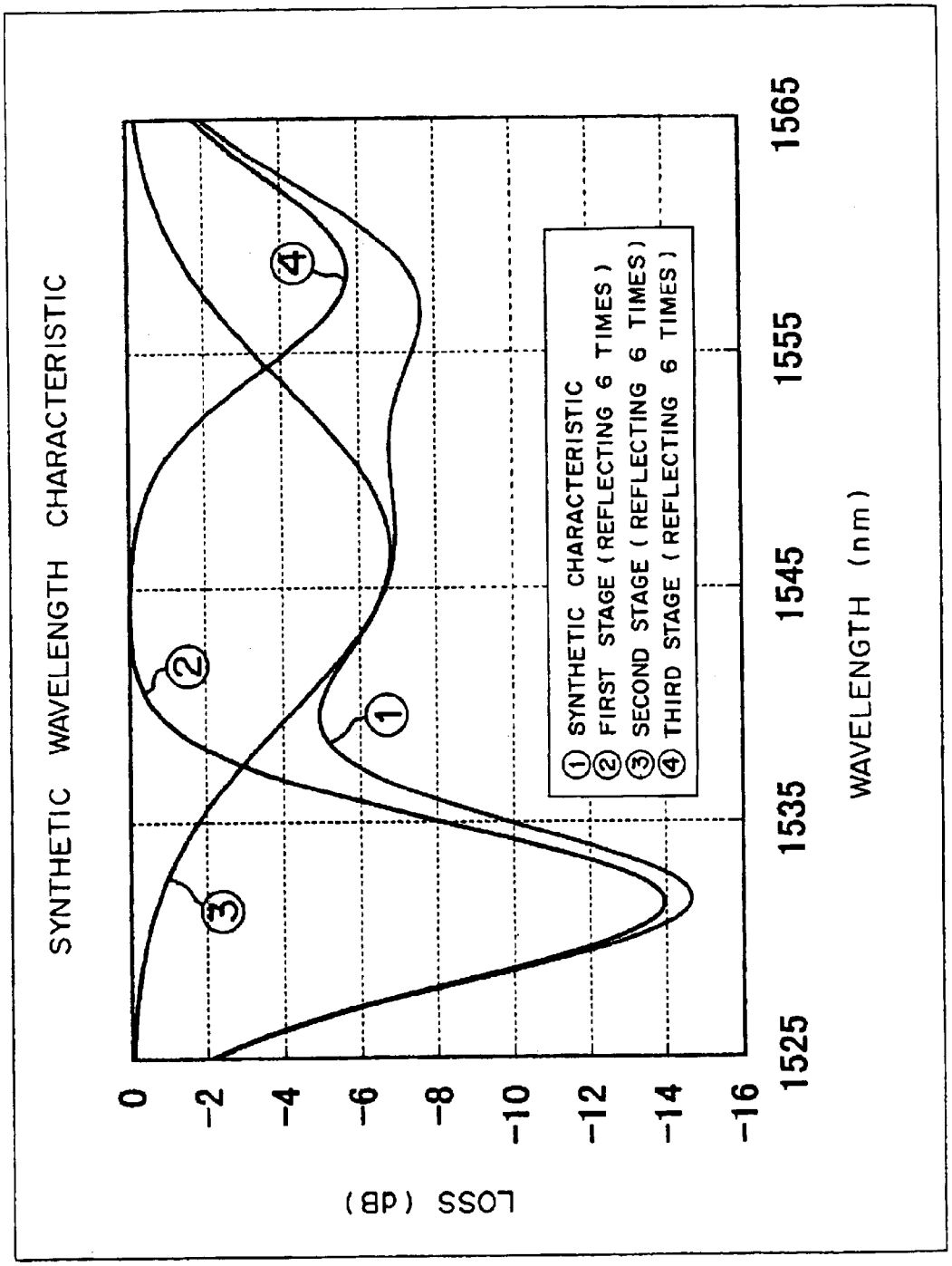
FIG. 21 shows an example of combining three wavelength characteristics (for example, reflection is repeated six times for each stage)

FIG. 21 shows an example of combining three wavelength characteristics (for example, reflecting 6 times at each stage).

As shown in FIG. 21, a complicated wavelength characteristic can be obtained by combining the simple single peak characteristics.

Figure 22:
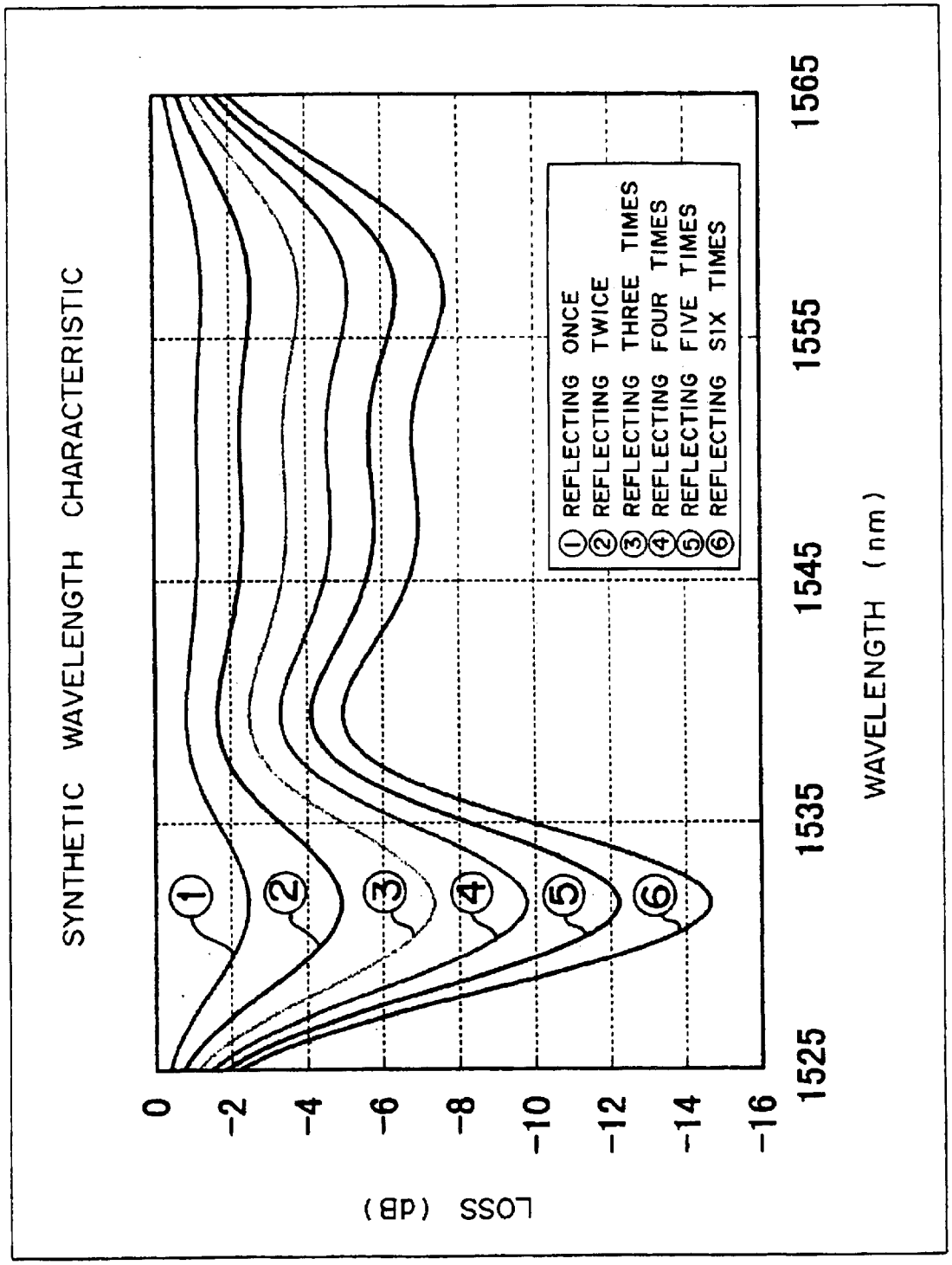
FIG. 22 shows an example of combining three wavelength characteristics (for example, reflection is repeated an equal number of times for each stage) when the positions of the movable mirrors 8, 34, and 35 are changed and the reflection frequency is changed for the optical films 24, 28, and 32.

FIG. 22 shows an example of combining three wavelength characteristics (for example, when reflecting the same number of times for each stage) with the positions of the movable mirrors 8, 34, and 35 changed, and the reflection frequency of the optical filters 24, 28, and 32 also changed.

The change of the wavelength characteristic as shown in FIG. 22 is the same as in the first embodiment. For example, it can be applied to a gain equalizer which can equalize the gain wavelength characteristic although an EDFA has a different length of EDF. However, including the first embodiment, the change of the wavelength characteristic as shown in FIG. 22 is a simple change, and various changes in wavelength characteristic cannot be expected. Therefore, a desired gain equalizer cannot be realized.

Figure 23:
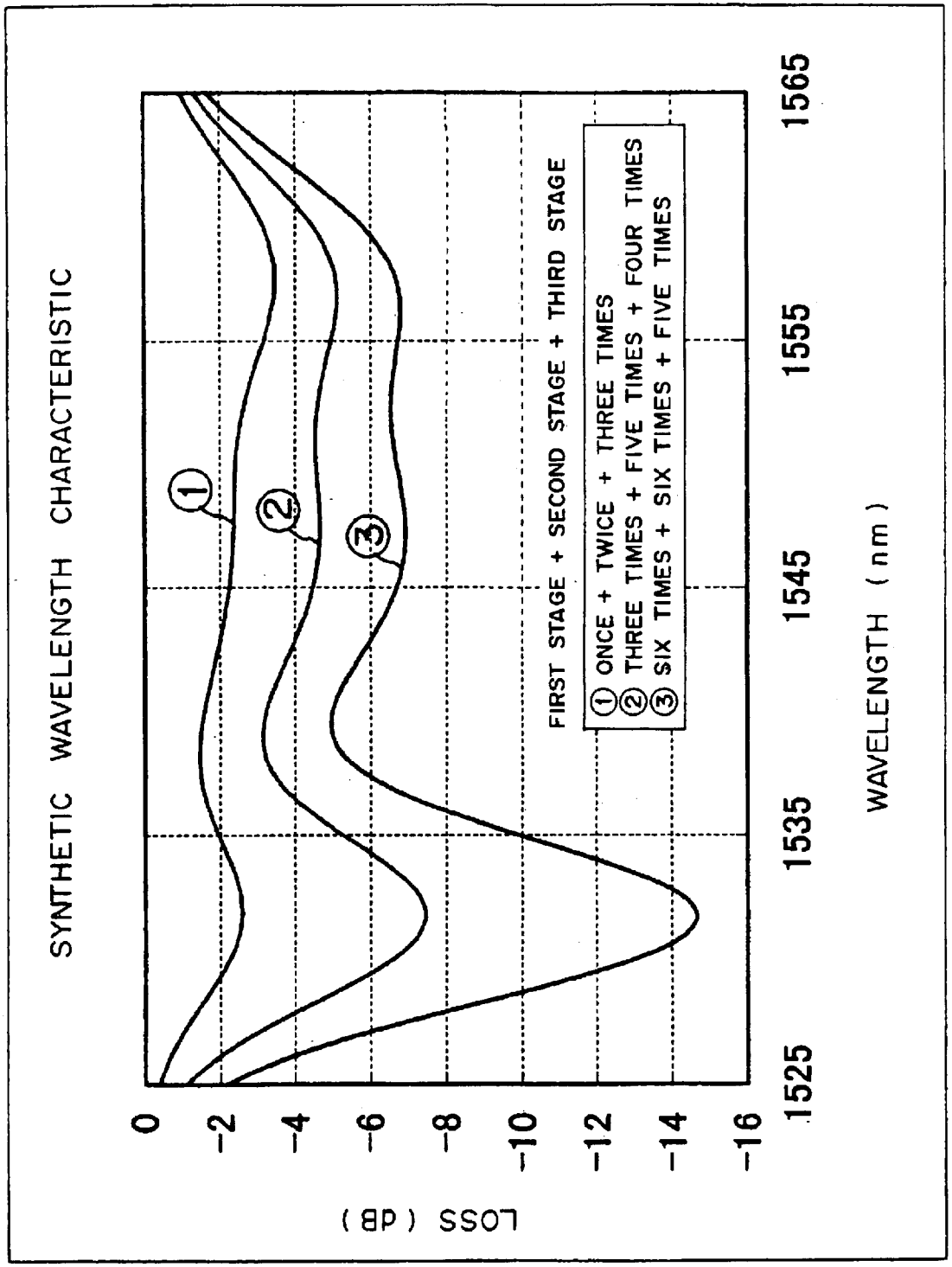
FIG. 23 shows the synthetic wavelength characteristic.

FIG. 23 shows a synthetic wavelength characteristic.

A feature of the present embodiment is to provide a widely applicable gain equalizer capable of combining various wavelength characteristics as shown in FIG. 23.

Described above is the embodiments in which an optical film formed by a dielectric multilayer film is used as an optical filter. In addition to an optical film, for example, a etalon filter, etc. can also be used.

Figure 24:
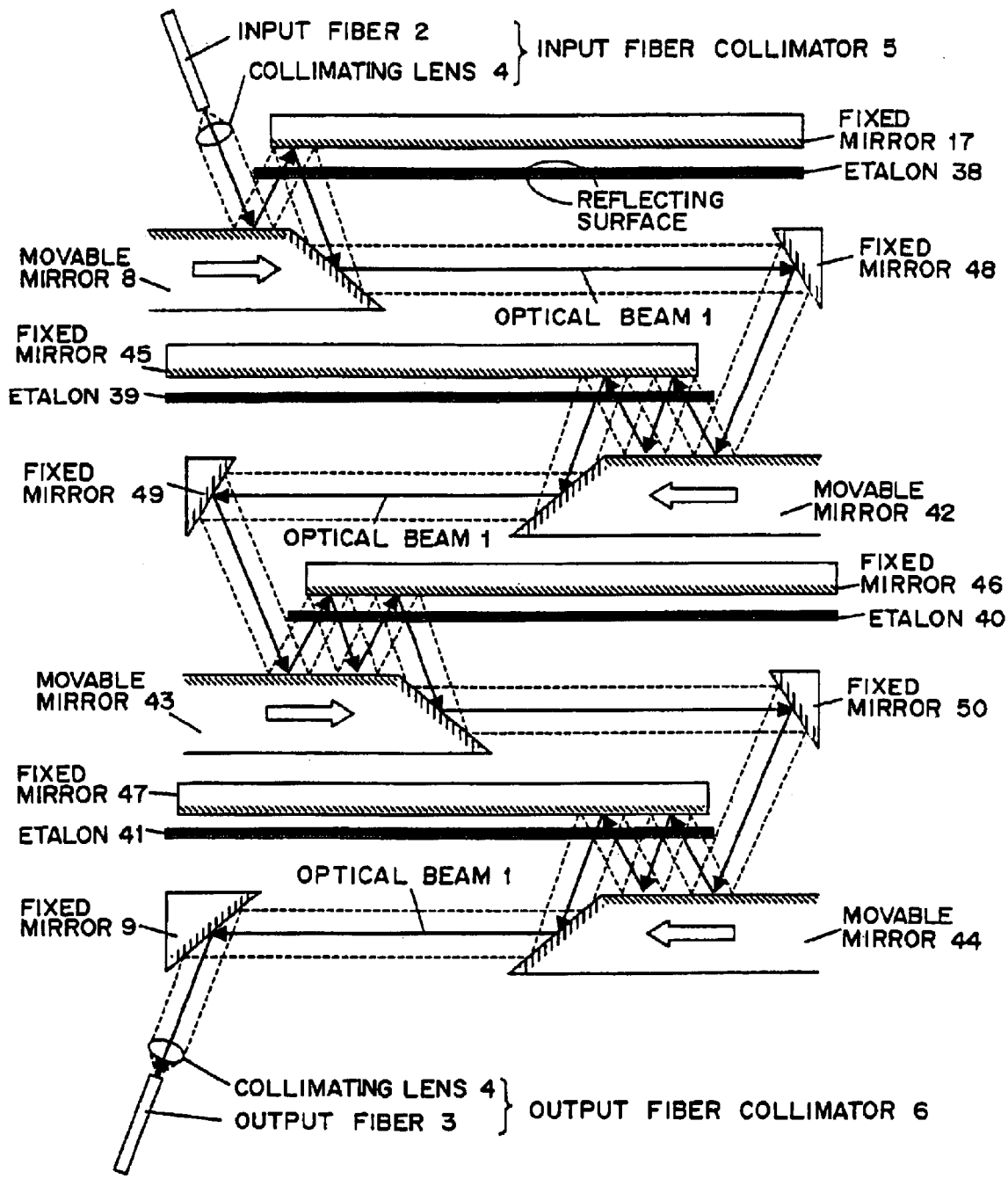
FIG. 24 shows the fifth embodiment of the present invention.
Figure 25:
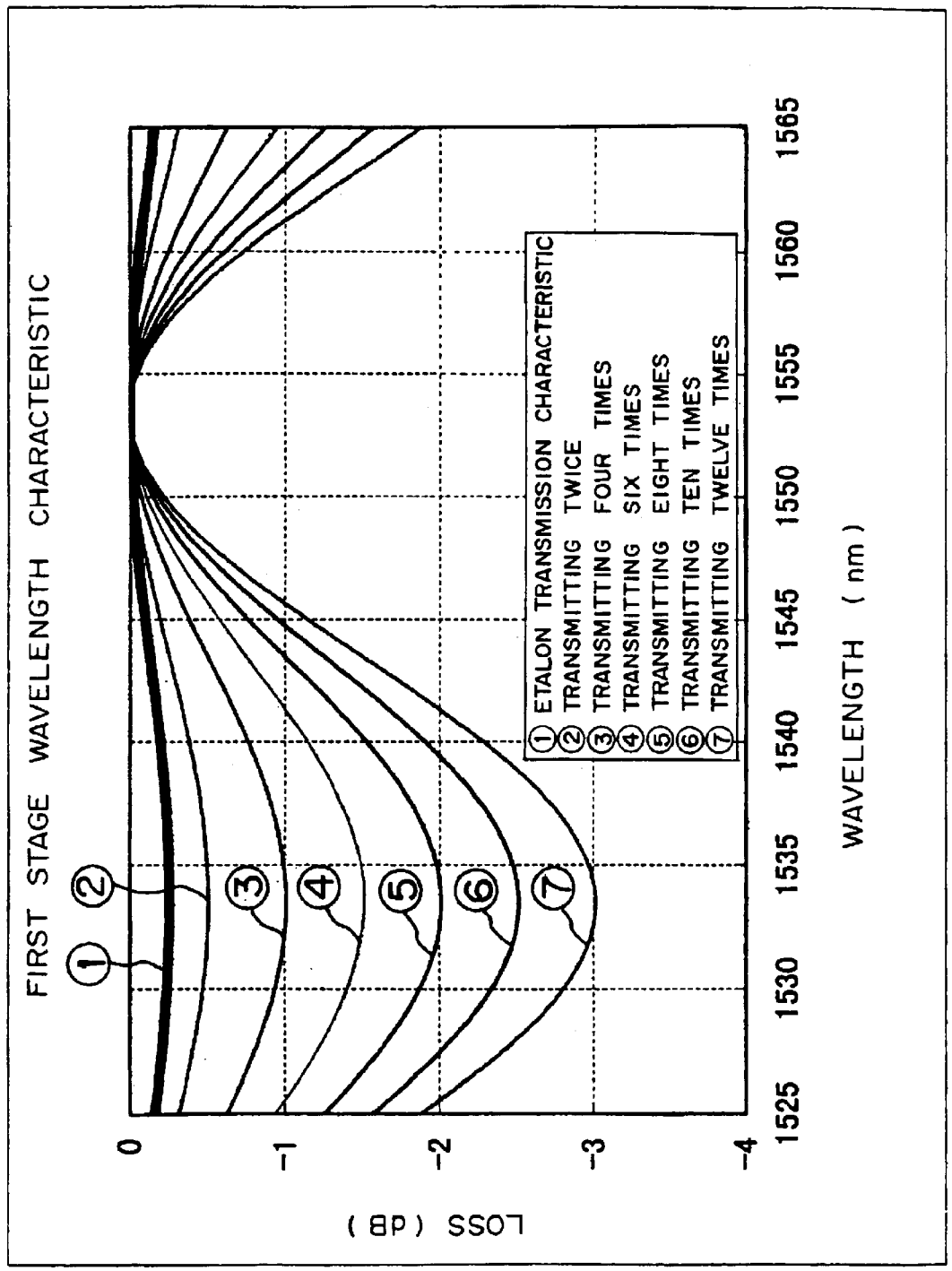
FIG. 25 shows the transmission wavelength characteristic (1) of an etalon filter.
Figure 26:
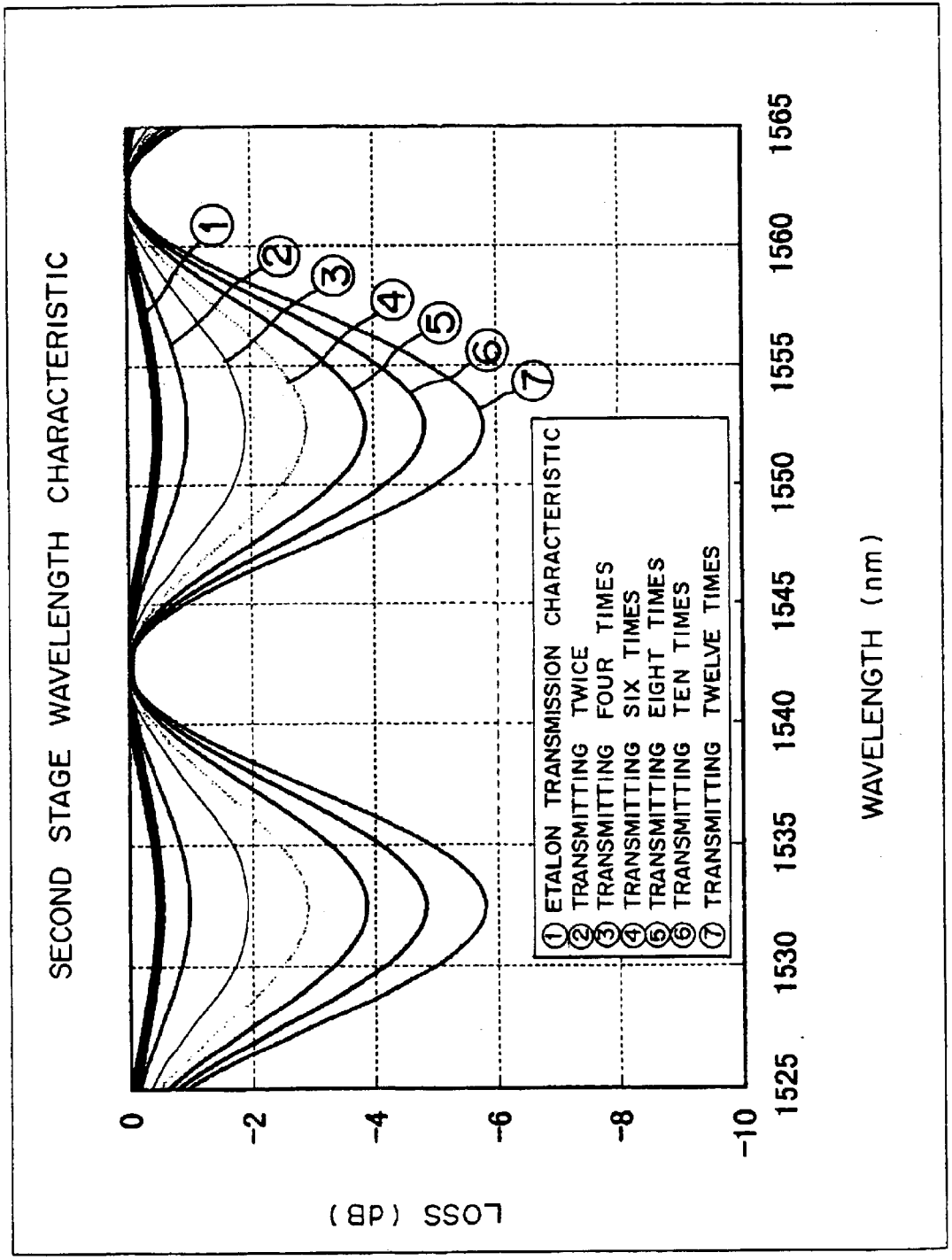
FIG. 26 shows the transmission wavelength characteristic (2) of an etalon filter.
Figure 27:
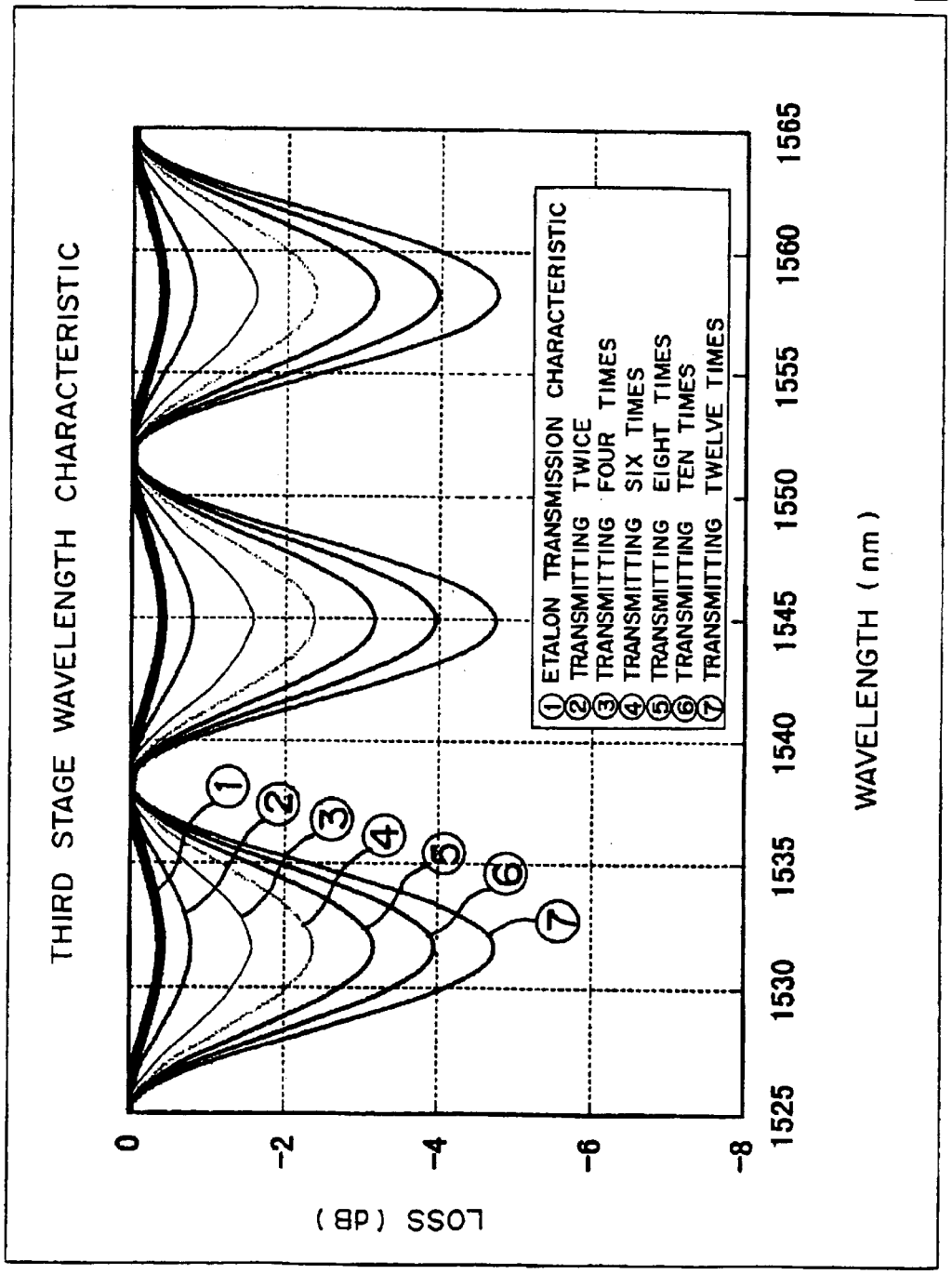
FIG. 27 shows the transmission wavelength characteristic (3) of an etalon filter.
Figure 28:
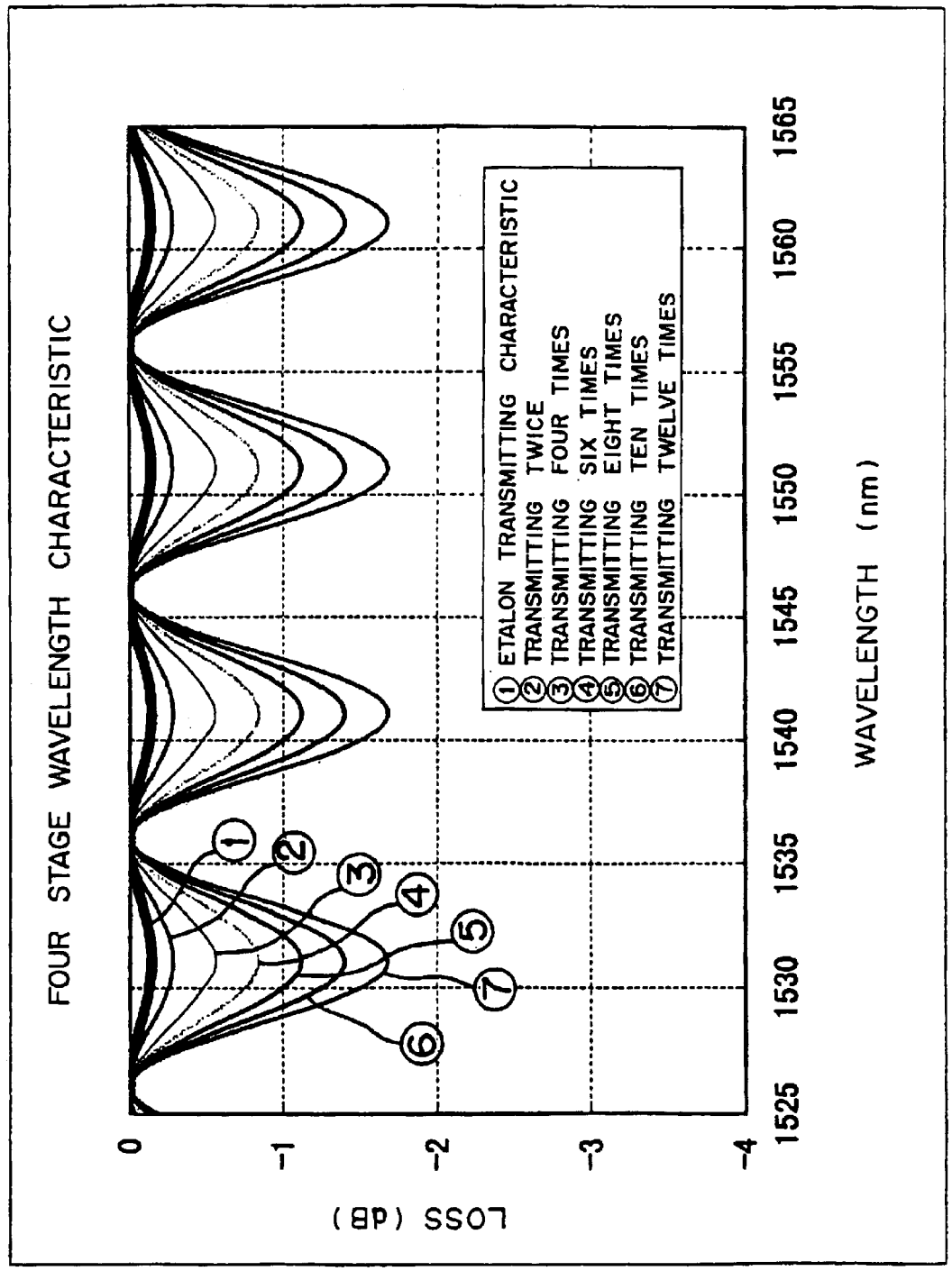
FIG. 28 shows the transmission wavelength characteristic (4) of an etalon filter.

FIG. 24 shows the fifth embodiment of the present invention.

The fifth embodiment is different from the third embodiment in that a transmission type etalon filter is used as an optical filter, and four stages of the wavelength characteristic variable apparatuses are connected through an optical beam. The etalon filter is formed by applying reflecting films on both sides of a thin glass plate, and functions as a filter having a periodic wavelength characteristic. The period of the wavelength characteristic of the etalon filter depends on the optical thickness (a product of the physical thickness and the refractive index) of the glass, and the amplitude depends on the reflectance of the reflecting film, thereby freely designing the wavelength characteristic.

FIGS. 25 through 28 show the transmission wavelength characteristic of an etalon filter.

The transmission wavelength characteristic of etalon filters 38, 39, 40, and 41 used in the present embodiment is a periodical wavelength characteristic. As in the fourth embodiment, the positions of the movable mirrors 8, 42, 43, and 44 are moved, and the reflection frequency of the etalon filters 38, 39, 40, and 41 is changed. Thus, the wavelength characteristic can be stepwise changed at each stage as shown in FIGS. 25, 26, 27, and 28.

Figure 29:
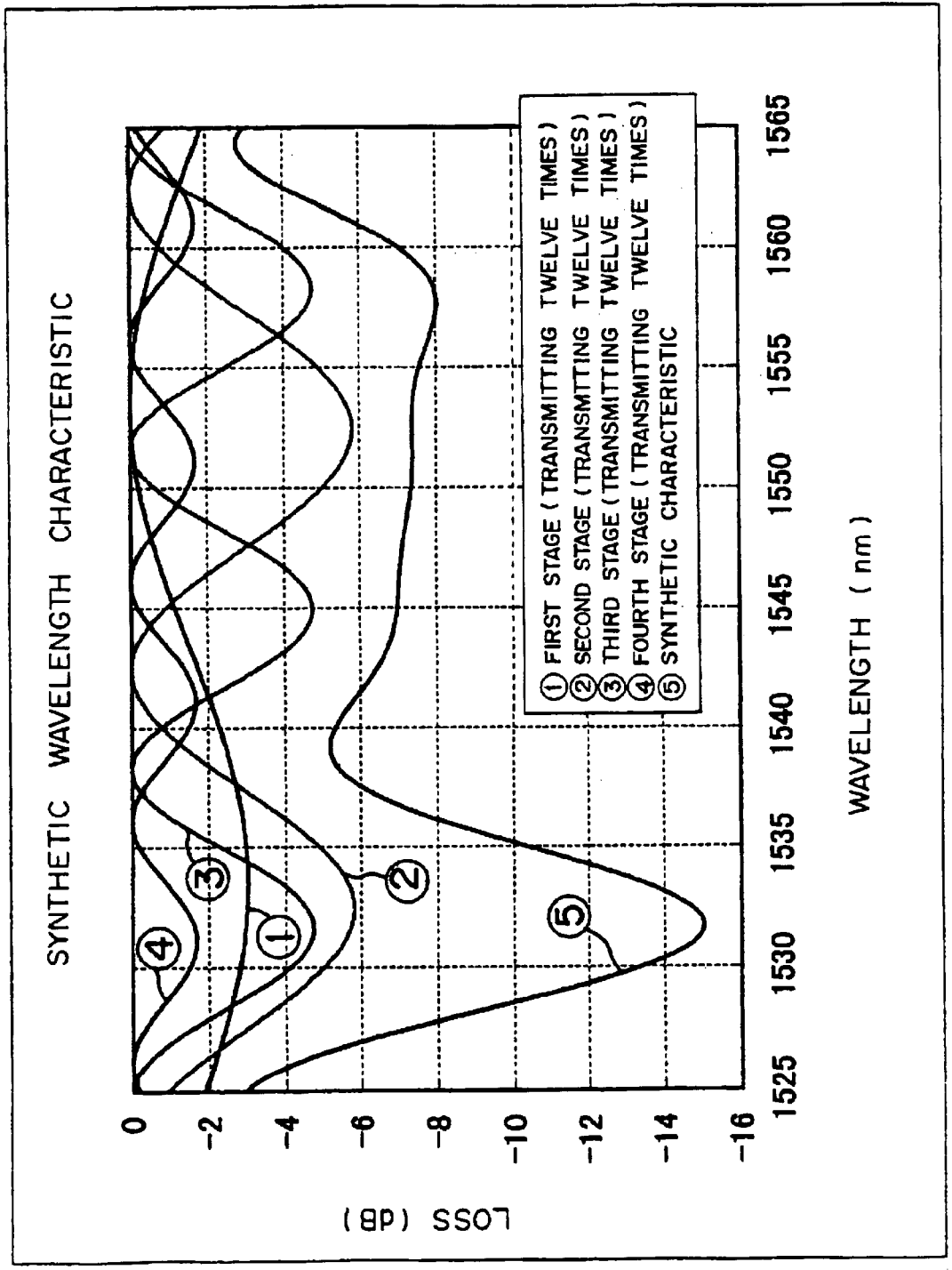
FIG. 29 shows an example of combining four wavelength characteristics (for example, transmission is repeated 12 times for each stage)

FIG. 29 shows an example of combining four wavelength characteristics (for example, transmitting 12 times at each stage).

As shown in FIG. 29, by combining periodic wavelength characteristics, a complicated wavelength characteristic can be obtained.

Figure 30:
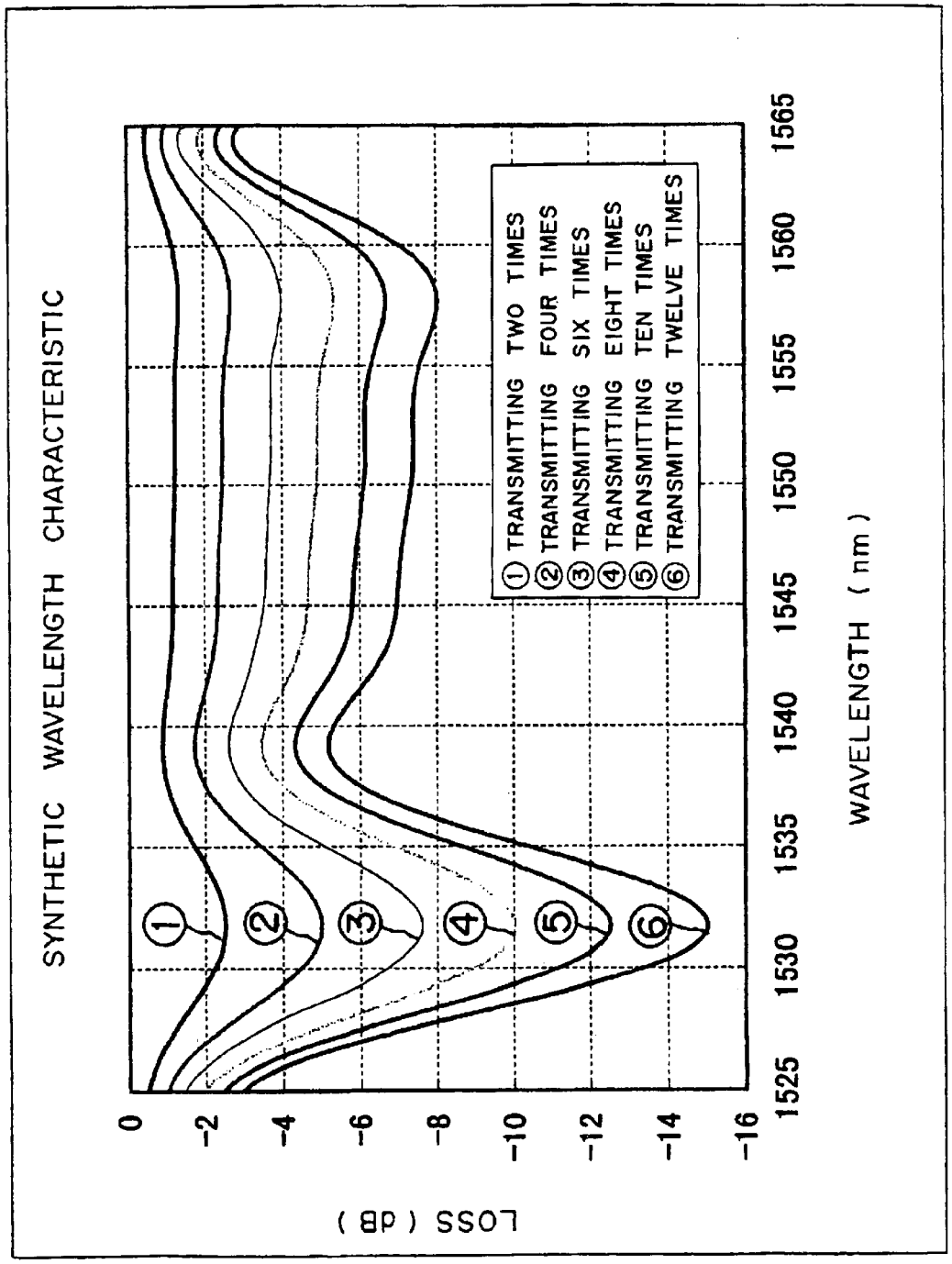
FIG. 30 shows an example of shifting the positions of the movable mirrors 8, 42, 43, and 44, and combining four wavelength characteristics when the transmission frequencies of the etalon filters 38, 39, 40, and 41 are varied.
Figure 31:
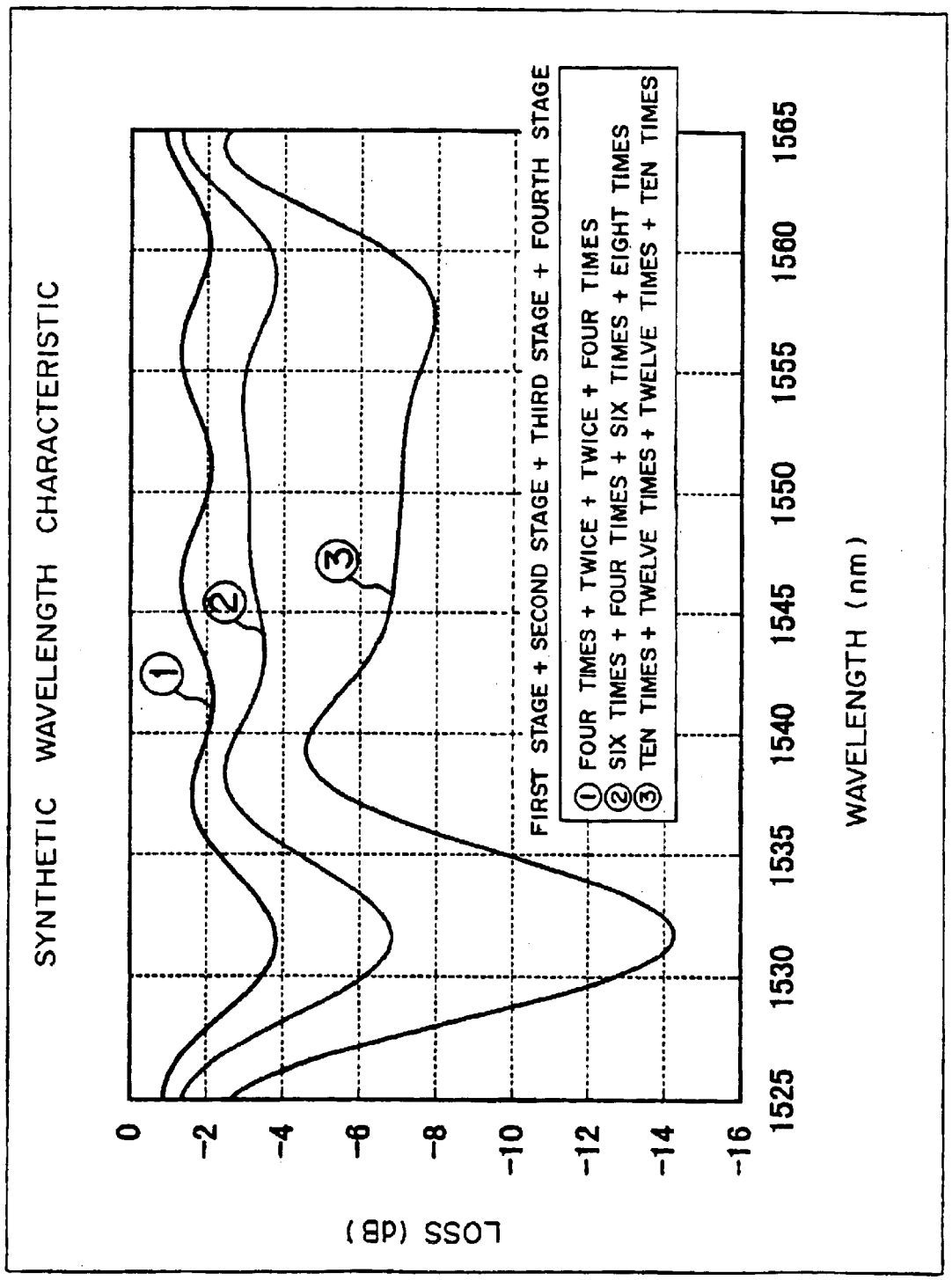
FIG. 31 shows an example of shifting the positions of the movable mirrors 8, 42, 43, and 44, and combining four wavelength characteristics when the transmission frequencies of the etalon filters 38, 39, 40, and 41 are varied.

FIGS. 30 and 31 show an example of combining four wavelength characteristics of moving the positions of the movable mirrors 8, 42, 43, and 44, and changing the reflection frequency of the etalon filters 38, 39, 40, and 41.

In FIG. 30, as in the first embodiment, the change of a wavelength characteristic is simple. However, as in the fourth embodiment, by changing the transmission frequency at each stage, various wavelength characteristics can be combined as shown in FIG. 31, and a widely applicable gain equalizer can be provided.

In the above mentioned embodiments, when a movable mirror is moved and the reflection frequency is changed on the movable mirror, the optical path of the optical beam between the input/output fibers and the total reflection count of the optical beams become different. At this time, when the coupling loss of an input/output fiber collimator depends on the optical path, or when the reflectance of a reflecting mirror is not sufficiently high, a loss can be changed if the reflection frequency is changed on the movable mirror. Described below is the sixth embodiment in view of the above mentioned problem.

Figure 32:
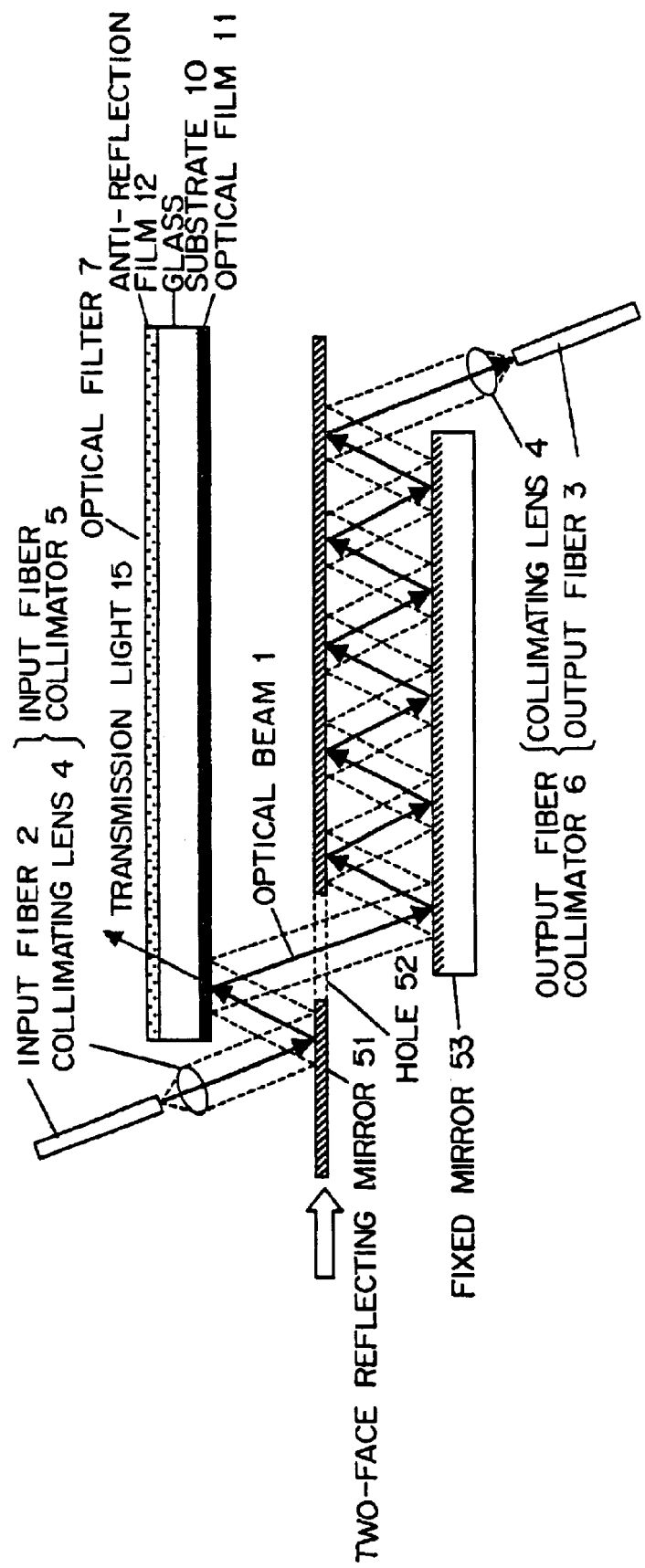
FIG. 32 shows the sixth embodiment (1) of the present invention.
Figure 33:
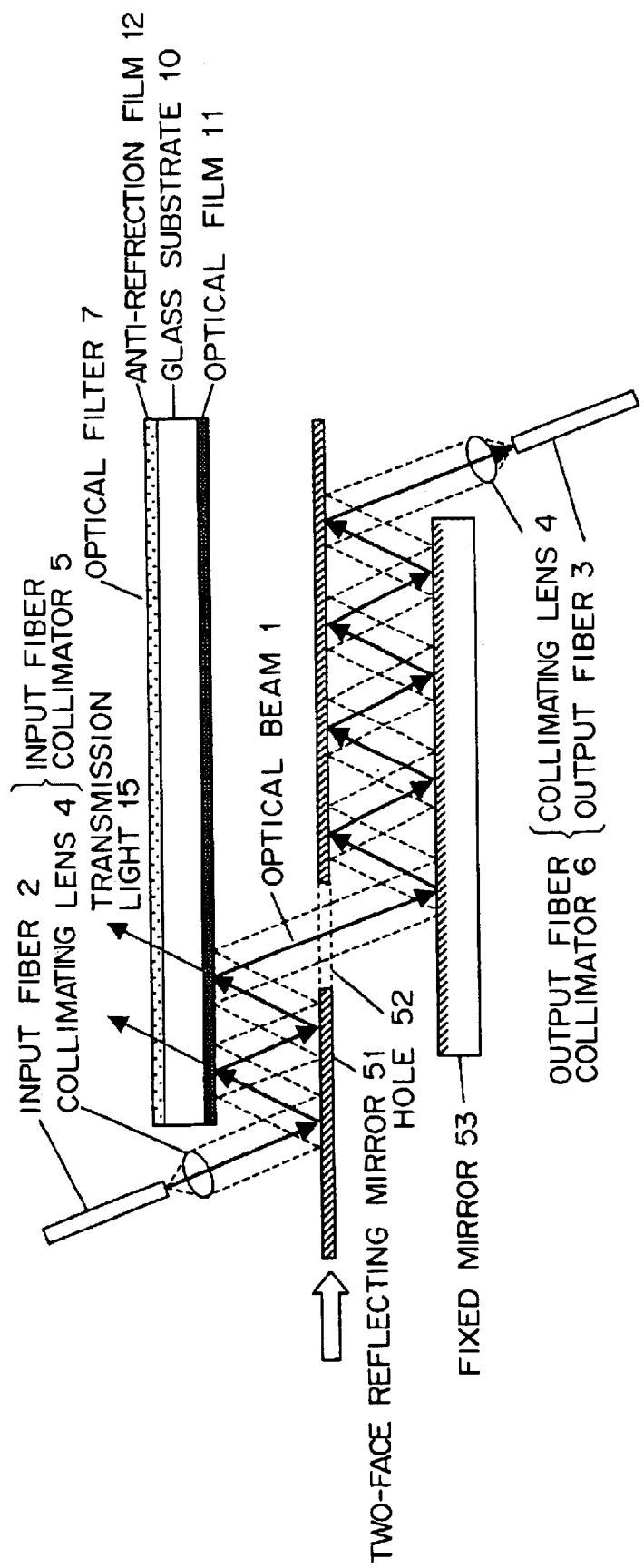
FIG. 33 shows the sixth embodiment (2) of the present invention.

FIGS. 32 and 33 show the sixth embodiment of the present invention.

FIG. 32 shows, as in the first embodiment, the input/output fibers 2 and 3 for generating substantially parallel optical beams 1 and the collimating lenses 4 form a pair of input/output fiber collimators 5 and 6, an optical filter having a desired wavelength characteristic, a two-face reflecting mirror 51 which can be spatially moved and has a hole 52 which is provided to allow an optical beam to enter plural times and through which the optical beam passes, and a fixed mirror 53 for turning back the optical beam 1 which has passed through the hole 52 of the two-face reflecting mirror, allowing the optical beam 1 to be reflected plural times between the two-face reflecting mirror 51 and the fixed mirror 53, and maintaining a constant optical path of the optical beam 1 between the input/output fiber collimators 5 and 6 and a constant reflection frequency of the optical beam 1. It is not always necessary that the hole 52 through which the optical beam provided in the two-face reflecting mirror 51 is a hole. For example, when the two-face reflecting mirror 51 is formed by a metal film such as Al (aluminum) applied on a glass substrate, the metal film can be replaced with an anti-reflection film as a hole through which light can practically pass.

The two-face reflecting mirror 51 according to the present embodiment and the movable mirror 8 according to the first embodiment have similar functions. The surface of the two-face reflecting mirror 51 is exactly parallel to the surface of the optical film 11. The fixed mirror 53 is also exactly parallel to the surface of the two-face reflecting mirror 51. Furthermore, like the movable mirror 8 in the first embodiment, the two-face reflecting mirror 51 is connected to the drive mechanism as shown in FIG. 2, and can be moved in the direction (arrow direction) parallel to the surfaces of the fixed mirror 53 and the optical film 11 with precision of several $\mu$m.

Described below is the path of the optical beam 1. The optical beam 1 output from the input fiber 2 is substantially paralleled by the collimating lens 4, turned back by the upper surface of the two-face reflecting mirror 51, and input into the optical film 11. Then, the optical beam 1 is reflected by the optical film 11, directed to the two-face reflecting mirror 51 again, reaches the fixed mirror 53 through the hole 52 of the two-face reflecting mirror 51, and is reflected by the fixed mirror 53. The transmission light 15 of the optical film 11 passes without being reflected by the anti-reflection film 12 formed on the glass substrate 10, and is discarded to suppress undesired influence. Furthermore, after repeating plural times the reflection between the fixed mirror 53 and the lower surface of the two-face reflecting mirror 51, the optical beam 1 is collected again by the collimating lens 4 and converges into the output fiber 3.

As in the first embodiment, it is necessary to set the optical beam 1 turned back on the upper surface of the two-face reflecting mirror 51 such that it cannot overlap the optical beam 1 reflected by the optical film 11 and returned to the two-face reflecting mirror 51. To attain this, it is necessary that the beam space is equal to or larger than the diameter of the optical beam 1, and the incident angle of the beam, the angle of the input fiber collimator 5 to the two-face reflecting mirror 51, and the designed incident angle of the optical film 11 are determined depending on the space between the two-face reflecting mirror 51 and the optical film 11. It is desired that the beam space for the reflection between the two-face reflecting mirror 51 and the fixed mirror 53 is equal to the beam space for the reflection between the two-face reflecting mirror 51 and the optical film 11, and the space between the two-face reflecting mirror 51 and the fixed mirror 53 is equal to the space between the two-face reflecting mirror 51 and the optical film 11.

In FIG. 32, the position of the movable mirror is set such that the optical beam 1 can be once reflected by the optical film 11, and the wavelength characteristic of the light output from the output fiber 3 is the reflection wavelength characteristic of the optical film 11. In FIG. 32, the total reflection count of the optical beam 1 between the input fiber 2 and the output fiber 3 is twelve.

FIG. 33 shows the state in which the position of the two-face reflecting mirror 51 is moved exactly by the beam space in the arrow direction with the configuration as shown in FIG. 32. In this state, the number of reflections of the optical beam 1 on the optical film 11 is 2, and the wavelength characteristic of the light output from the output fiber 3 is the characteristic obtained by twice accumulating the reflection wavelength characteristic of the optical film 11. At this time, the moving direction of the two-face reflecting mirror 51 is parallel to the surface of the two-face reflecting mirror 51 (and the optical film 11 and the fixed mirror 53). Therefore, although the two-face reflecting mirror 51 is moved, the angle of the optical beam 1 is not shifted, thereby causing the no coupling loss increased by the output fiber 3 due to the angle shift of the optical beam 1. Thus, according to the present embodiment, by moving the position of the two-face reflecting mirror 51 in the arrow direction by a multiple of beam space, the wavelength characteristic of the light output from the output fiber 3 can be stepwise changed as if the reflection wavelength characteristic of the optical film 11 were accumulated.

According to the present embodiment, since the optical film 11 having the wavelength characteristic as in the first embodiment is used, the change of the wavelength characteristic is similar to the change in the first embodiment (shown in FIG. 6). Therefore, it can be used as a gain equalizer.

In FIG. 33, the total number of reflections of the optical beam 1 between the input fiber 2 and the output fiber 3 is 12 as in the case shown in FIG. 32. Furthermore, the optical path of the optical beam 1 between the input fiber 2 and the output fiber 3 is the same in FIGS. 32 and 33.

Thus, although the two-face reflecting mirror 51 is moved, and the number of reflections on the optical film 11 is changed, the optical path of the optical beam 1 between the input fiber 2 and the output fiber 3, and the total number of reflections of the optical beam are not changed. Therefore, a loss is unchanged although the coupling loss of the input/output fiber collimators 5 and 6 depends on the optical path, and the reflectance of the reflecting mirror is not sufficiently high.

According to the embodiments described above, one movable mirror is moved parallel to an optical filter, but other configurations can be adopted.

Figure 34:
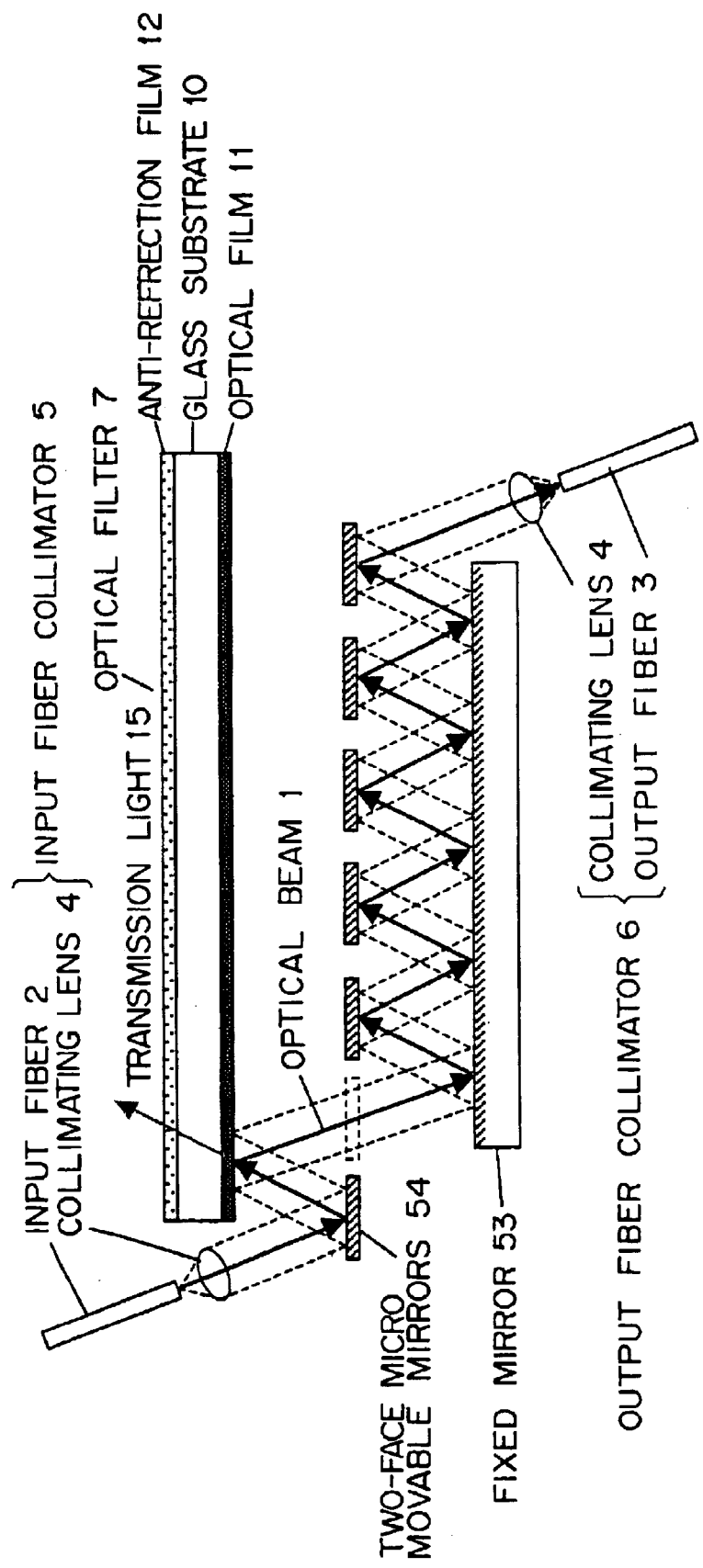
FIG. 34 shows the seventh embodiment of the present invention.

FIG. 34 shows the seventh embodiment of the present invention.

The seventh embodiment is different from the sixth embodiment in that the two-face reflecting mirror 51 is replaced with a plurality of (seven in the present embodiment) small two-face mirrors (hereinafter referred to as two-face micro movable mirrors 54) movable vertical to the sheet of FIG. 34. The reflecting surface of each of the two-face micro movable mirrors 54 is parallel to the optical film 11 and the fixed mirror 53 as in the sixth embodiment.

Figure 36:
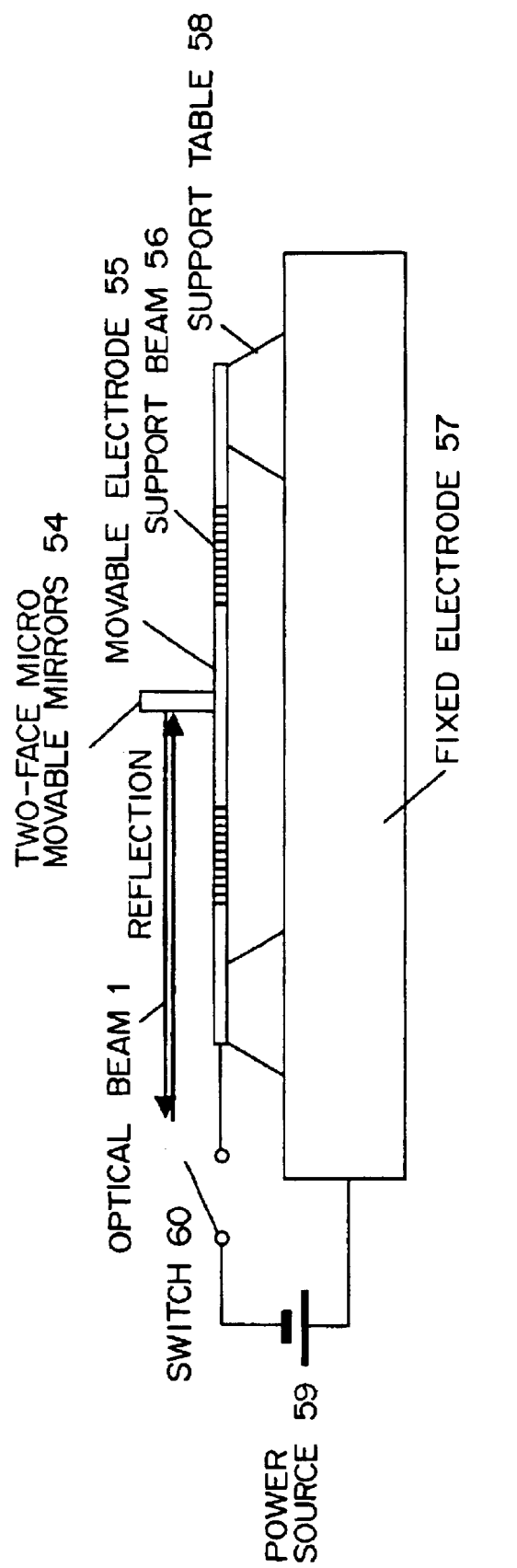
FIG. 36 shows an example (1) of a method of vertically moving the two-face micro movable mirror 54.
Figure 37:
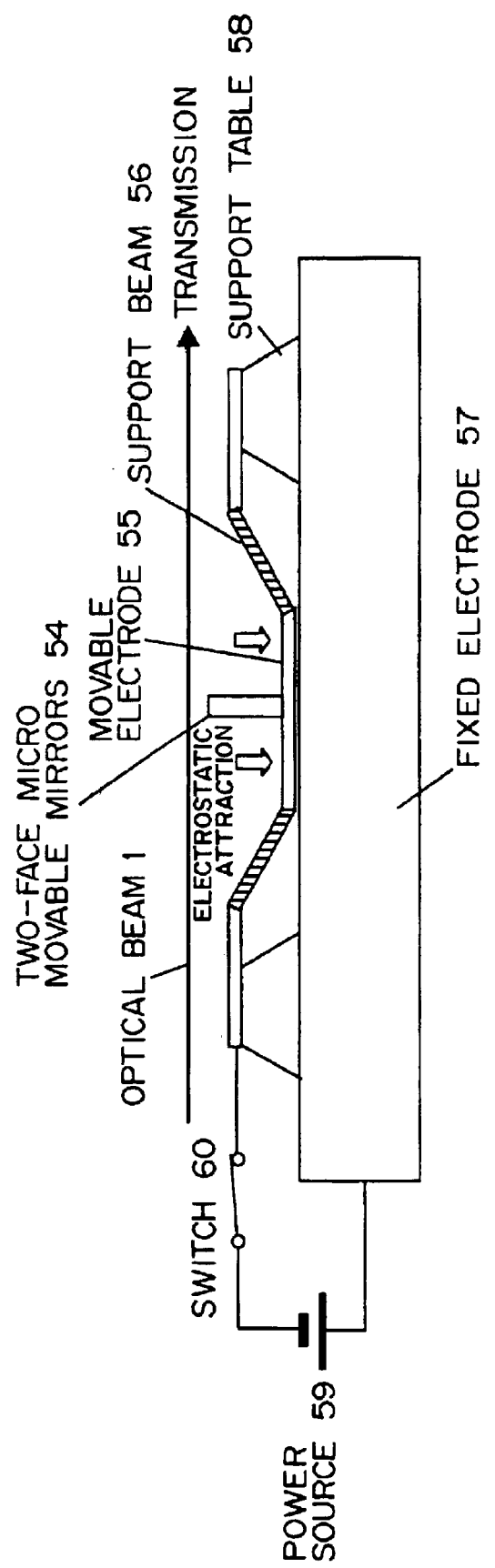
FIG. 37 shows an example (2) of a method of vertically moving the two-face micro movable mirror 54.
Figure 38:
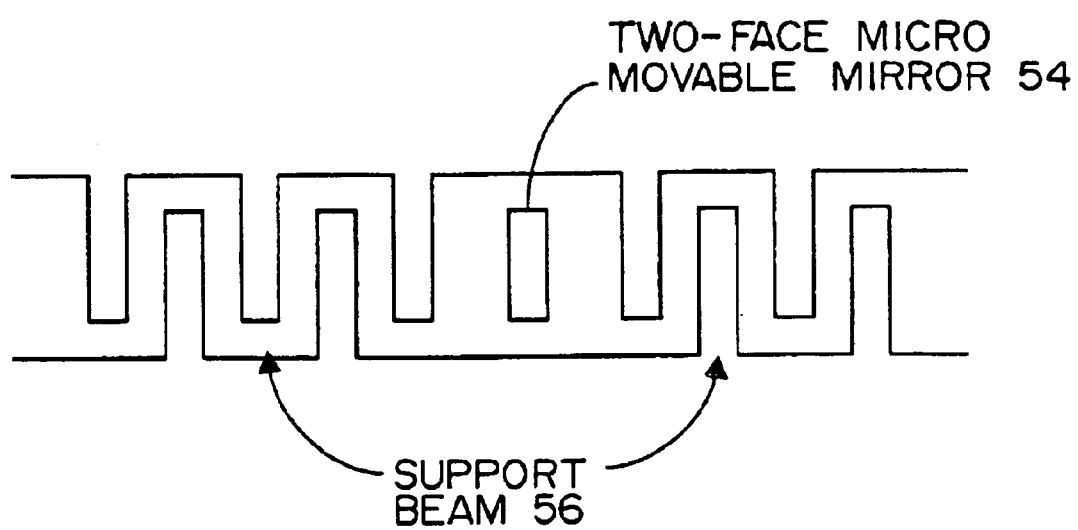
FIG. 38 shows an example (3) of a method of vertically moving the two-face micro movable mirror 54.

FIGS. 36, 37, and 38 show an example of the method of moving the two-face micro movable mirrors 54 in the vertical direction.

The two-face micro movable mirrors 54 is mounted on a conductive movable electrode 55, and the movable electrode 55 is provided on a support table 58 comprising an insulator on a fixed electrode 57 through a support beam 56. The support beam 56 and the fixed electrode 57 are electrically connected to a direct current power source 59 and a switch 60.

If the switch is turned off as shown in FIG. 36, then the two-face micro movable mirror 54 is inserted into the optical path of the optical beam 1, and the optical beam 1 is reflected by the two-face micro movable mirror 54. If the switch is turned on as shown in FIG. 37, then electrostatic attraction occurs between the movable electrode 55 and the fixed electrode 57, and the movable electrode 55 is attracted toward the fixed electrode 57 by the electrostatic attraction. Thus, the two-face micro movable mirror 54 is moved toward the fixed electrode 57, the two-face micro movable mirror 54 is removed from the optical path of the optical beam 1, and the optical beam 1 can pass straight. The moving stroke of the two-face micro movable mirror 54 depends on the height of the support table 58, and the height of the support table 58 has to be at least equal to or higher than the beam diameter of the optical beam 1. Furthermore, the size of the two-face micro movable mirror 54 is a little larger than the beam diameter of the optical beam 1. The support beam 56 is designed to be dynamically transformed by the zigzag cut in the support plate of the two-face micro movable mirrors 54 as shown in FIG. 38. With the design, when the movable electrode 55 is attracted by the electrostatic attraction, the table of the two-face micro movable mirrors 54 can be moved downward.

According to the present embodiment, the mechanism of moving the two-face micro movable mirrors 54 as shown in FIGS. 36, 37, and 38 is used. However, other methods can be used, that is, the method of moving the two-face micro movable mirrors 54 is not specifically limited.

The path of the optical beam 1 is described below by referring to FIG. 34. As in the sixth embodiment, after the optical beam 1 output from the input fiber 2 is paralleled by the collimating lens 4, the switch is turned off, the optical beam is turned back on the upper surface of the first two-face micro movable mirror 54 inserted into the optical beam 1, and enters the optical film 11. Then, the optical beam 1 is reflected by the optical film 11, and is directed to the second two-face micro movable mirror 54. Since the second two-face micro movable mirror 54 is switched off, and is removed from the optical beam 1, the optical beam 1 passes straight without reflection by the two-face micro movable mirrors 54, and is reflected by the fixed mirror 53 when the optical beam 1 reaches the fixed mirror 53. The transmission light 15 of the optical film 11 passes without reflection by the anti-reflection film 12 formed on the glass substrate 10, and is then discarded to suppress undesired influence. Furthermore, the optical beam 1 is reflected plural times between the fixed mirror 53 and the lower surface of the plurality of switched-off two-face micro movable mirrors 54, collected by the collimating lens 4 again, and converged into the output fiber 3.

In FIG. 34, the positions of the two-face micro movable mirrors 54 are determined such that the number of reflections of the optical beam 1 on the optical film 11 is one, and the wavelength characteristic of the light output from the output fiber 3 is the reflection wavelength characteristic of the optical film 11.

Figure 35:
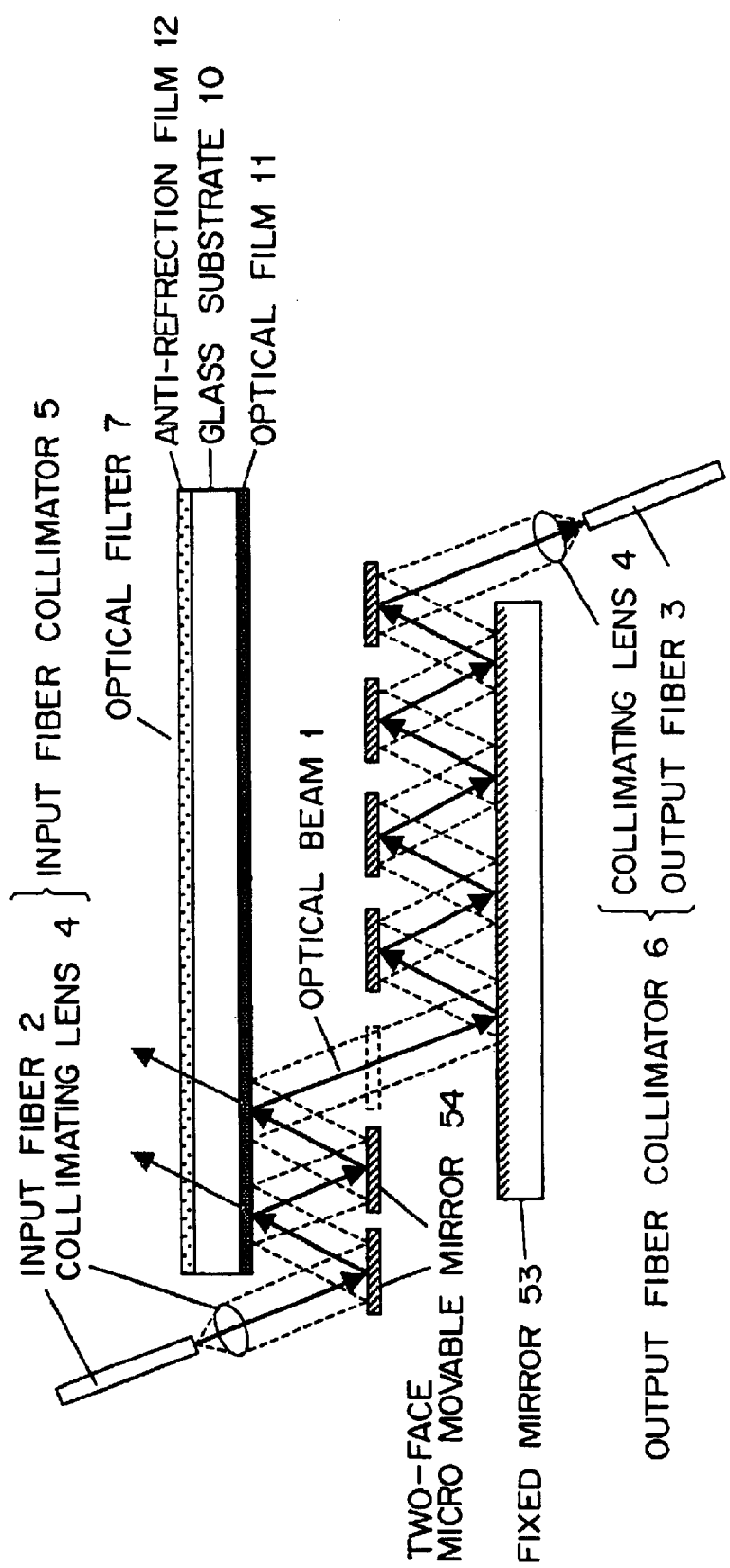
FIG. 35 shows the state in which the switch of the second two-face micro movable mirror 54 is turned off, and the switch of the third two-face micro movable mirror 54 is turned on with the configuration shown in FIG. 34.

FIG. 35 shows the state in which the switch of the second two-face micro movable mirror 54 is turned off with the configuration similar to that shown in FIG. 34, and the switch of the third two-face micro movable mirror 54 is turned on. At this time, the number of reflections of the optical beam 1 on the optical film 11 is two, and the wavelength characteristic of the light output from the output fiber 3 is the characteristic obtained by twice accumulating the reflection wavelength characteristic of the optical film 11.

Thus, according to the present embodiment, the ON/OFF switch of each of the two-face micro movable mirrors 54 is appropriately set to move the mirror to an appropriate position and appropriately select the optical path of the optical beam 1. Thus, the wavelength characteristic of the light output from the output fiber 3 can be stepwise changed as if the reflection wavelength characteristic of the optical film 11 were accumulated. According to the present embodiment, since the optical film 11 having the wavelength characteristic as in the first embodiment is used, the change of the wavelength characteristic is similar to the change in the first embodiment (shown in FIG. 6). Therefore, it can be used as a gain equalizer.

Furthermore, according to the present embodiment, when the two-face micro movable mirrors 54 are moved, and the number of reflections on the optical film 11 is changed, the optical path of the optical beam between the input fiber 2 and the output fiber 3 and the total number of reflections of the optical beam are not changed. Therefore, although the coupling loss of the input/output fiber collimators 5 and 6 depends on the optical path, and the reflectance of the reflecting mirror is not sufficiently high, the loss is unchanged.

As in the first through sixth embodiments, an example of a variation of the present embodiment, a plurality of wavelength characteristic variable apparatuses according to the present embodiment can be connected in series, or transmission type optical film and a transmission type etalon filter can be used as a transmission type optical filter.

Furthermore, according to the above mentioned embodiments, parallel optical beams are transmitted in space. However, light can also be transmitted through a waveguide.

FIGS. 39 through 44 show the eighth embodiment of the present invention.

Figure 39:
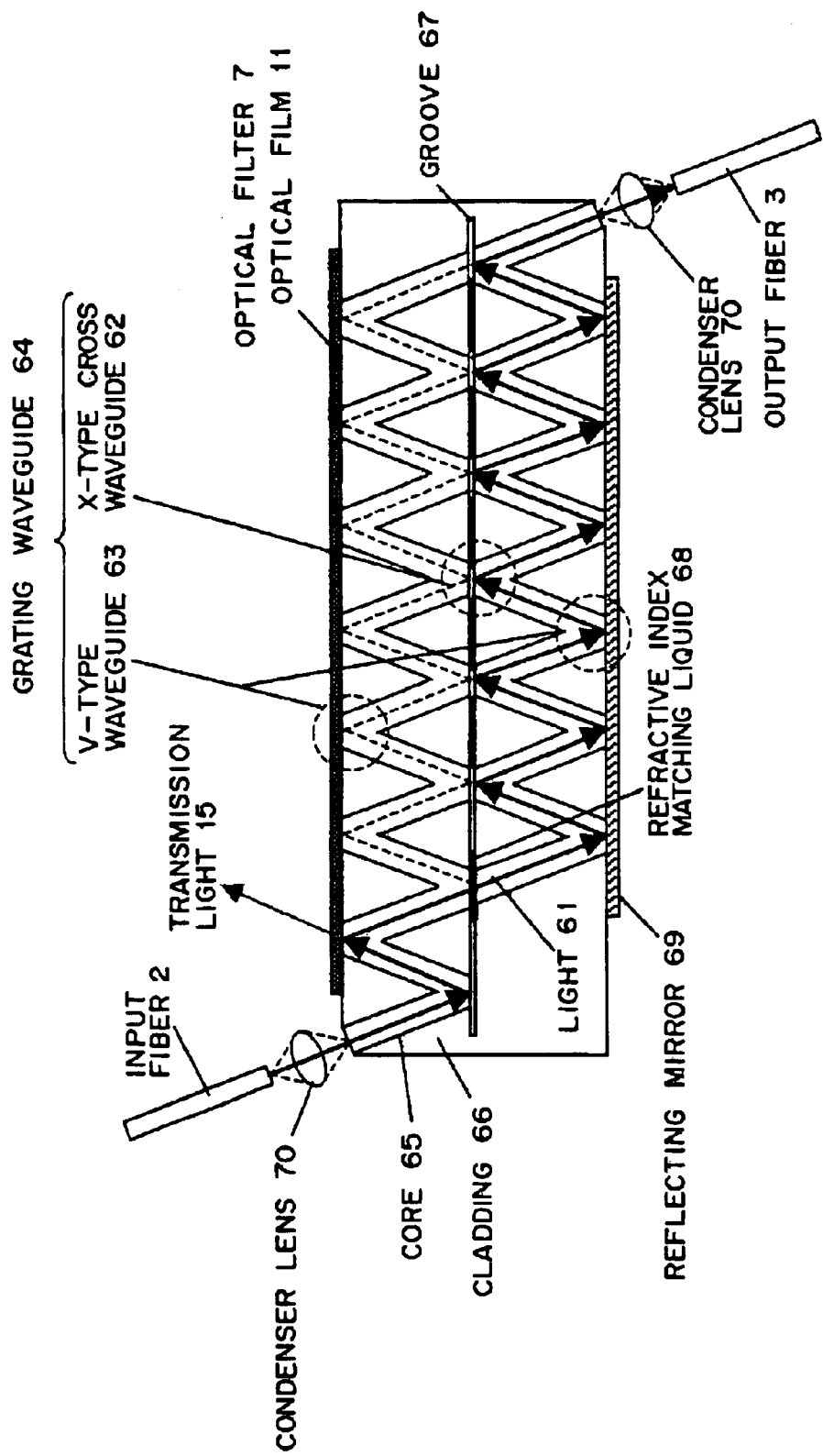
FIG. 39 shows the eighth embodiment (1) of the present invention.

FIG. 39 show input/output fibers 2 and 3 for generating a light 61, a grating waveguide 64 obtained by connecting a number of stages of X-type cross waveguides 62 through a V-type waveguide 63 through which the light 61 from the input fiber 2 is transmitted, a groove 67 formed where the waveguides cross, a refractive index matching liquid 68 having the same refractive index as a core 65 of the waveguide, enclosed by the groove 67, a heater (not shown in FIG. 39, but shown in FIGS. 41 through 44) provided to move, generate, or delete the refractive index matching liquid 68 by heat as necessary, and allow the transmitted light 61 to totally pass or be reflected by the X-type cross waveguide 62, the reflecting type optical filter 7 having a desired wavelength characteristic formed on one end of the V-type waveguide 63, and a reflecting mirror 69 formed on the other end of the V-type waveguide 63.

According to the present embodiment, a condenser lens 70 is used to effectively connect the light 61 output from the input fiber 2 to the core 65, and the light 61 output from the core 65 of the grating waveguide 64 to the output fiber 3. However, the condenser lens 70 is not always required, and the input/output fibers 2 and 3 can be connected to the core 65.

The optical filter 7 used in the present embodiment is formed by the optical film 11 comprising a dielectric multilayer film directly applied on one end of the V-type waveguide 63. The optical film 11 functions as a reflecting type optical filter having a desired reflection characteristic at an incident angle depending on the angle of the V-type waveguide 63. According to the present embodiment, the optical film 11 in the first embodiment is used as the reflecting type optical filter 7.

Furthermore, according to the present embodiment, the reflecting mirror 69 is formed on one end of the V-type waveguide 63, but the reflecting mirror 69 is not always required, but the reflecting end can be formed using the total reflection by the refractive index difference between the core 65 of the V-type waveguide 63 and air.

Described below is the path of the light 61. The light 61 output from the input fiber 2 is collected by the condenser lens 70, then converged into the core 65 exposed at the end of the grating waveguide 64, and transmitted through the core 65 of the grating waveguide 64. Then, the light is turned back by the total reflection from the refractive index difference between the core 65 and thin air in the groove 67 formed in the first cross waveguide 62, and enters the optical film 11. Then, the light 61 is reflected by the optical film 11, transmitted through the core 65, and directed to the groove 67. Since there is the refractive index matching liquid 68 having the same refractive index as the core 65 of the waveguide in the groove 67 of the second cross waveguide 62, the light 61 passes straight without the total reflection by the groove 67, and is reflected by the reflecting mirror 69 at the end of the V-type waveguide 63. Furthermore, the transmission light 15 of the optical film 11 is discarded to suppress undesired influence. Then, the light 61 is totally reflected by the groove 67, repeatedly reflected plural times by the reflecting mirror 69 at the end of the V-type waveguide 63, output from the end of the grating waveguide 64, collected by the condenser lens 70 again, and then converged into the output fiber 3.

Figure 41:
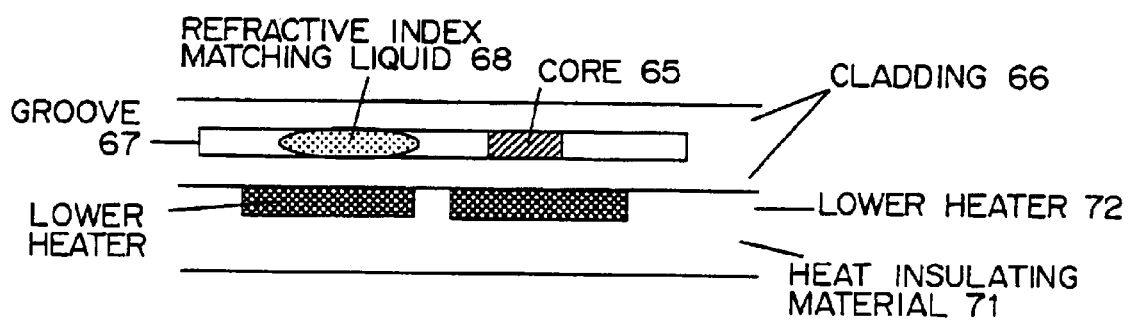
FIG. 41 shows the eighth embodiment (3) of the present invention.
Figure 42:
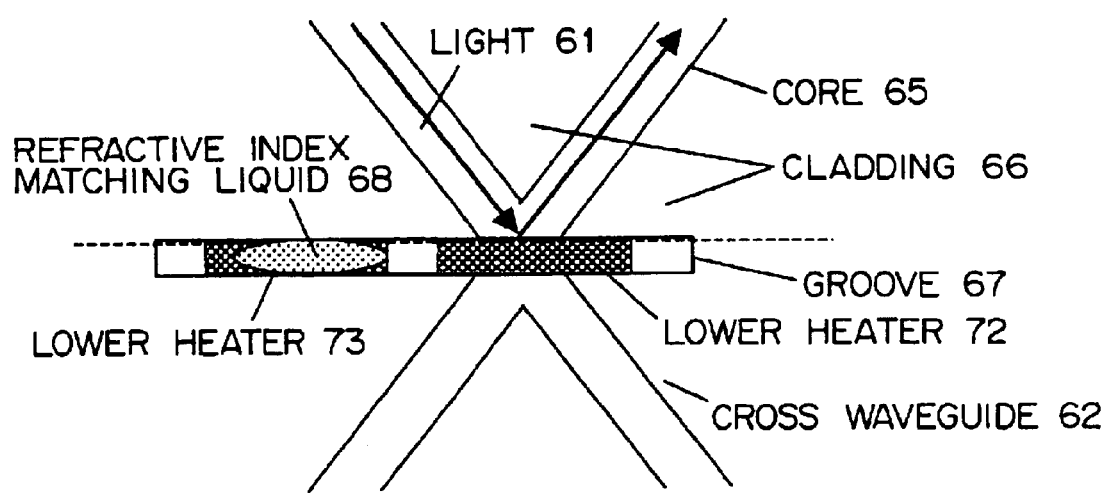
FIG. 42 shows the eighth embodiment (4) of the present invention.

An example of a method of moving the refractive index matching liquid 68 by heat as necessary by referring to FIGS. 41 through 44. FIG. 42 is an enlarged view from the X-type cross waveguide 62. FIG. 41 is an enlarged sectional view along the dotted line shown in FIG. 42. The refractive index matching liquid 68 is enclosed in the groove 67 formed in the cladding 66. The portion not containing the refractive index matching liquid 68 in the groove 67 is filled with thin air. There is a heat insulating material 71 under the cladding, and lower heaters 72 and 73 are embedded in the heat insulating material 71. One heat insulating material 71 is immediately below the groove 67 at the crossing of the waveguides, and the other lower heater 73 is apart from the groove 67 at the crossing of the waveguides.

In FIGS. 41 and 42, the refractive index matching liquid 68 is contained in the groove 67 on the lower heater 73, and the core 65 of the cross waveguide 62 touches the thin air in the groove 67. In this state, the light 61 enters the cross waveguide 62 is turned back by the total reflection by the refractive index difference between the core 65 and the air. Practically, assuming that the refractive index of the core 65 is 1.45, and the refractive index of the thin air is 1, the critical angle of the total reflection is 43.6 degrees. Therefore, if the angle made by the axis of the cross waveguide 62 and the vertical line to the groove 67 is 44 degrees or more, the total reflection can be realized.

Figure 43:
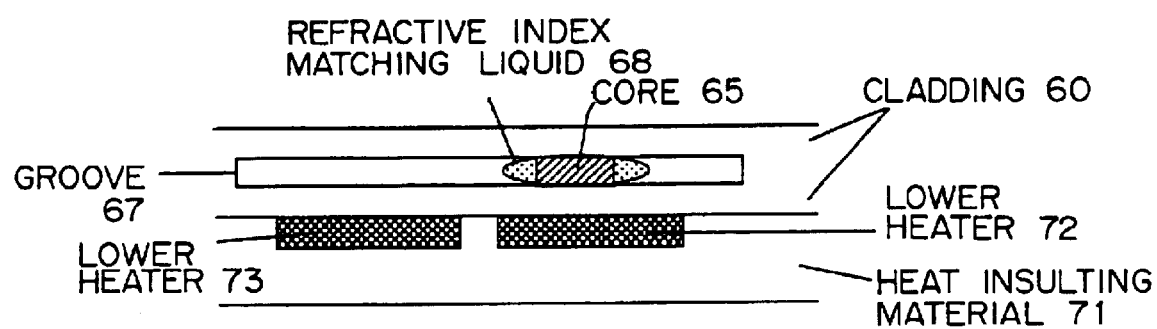
FIG. 43 shows the eighth embodiment (5) of the present invention.
Figure 44:
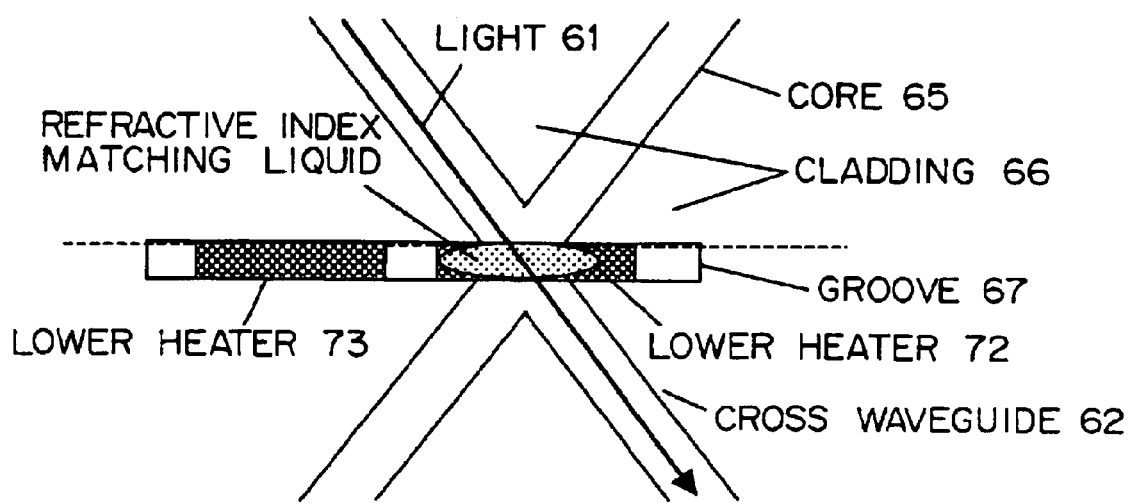
FIG. 44 shows the eighth embodiment (6) of the present invention.

If the electric current flows from the power source not shown in the attached drawings only to the lower heater 73 for heating, then the temperature rises at the groove 67 on the lower heater 73, the surface tension of the refractive index matching liquid 68 on the lower heater 73 drops as shown in FIGS. 43 and 44, and the refractive index matching liquid 68 is moved to the groove 67 at the crossing of the waveguides on the lower heater 72 at a lower temperature by the thermal capillary action. According to the present embodiment, silicon oil having the surface tension of about 30 mN/m and changing by approximately 25% at a temperature difference of 100° C. is used as the refractive index matching liquid 68. In this state, since the refractive index matching liquid 68 corresponds to the core 65 of the X-type cross waveguide 62, the light 61 enters the X-type cross waveguide 62 and passes straight without total reflection.

Furthermore, in the states shown in FIGS. 43 and 44, if the electric current flows from the power source not shown in the attached drawings only to the lower heater 72 for heating, then the temperature rises at the groove 67 on the lower heater 72, the surface tension of the refractive index matching liquid 68 on the lower heater 72 drops, and the refractive index matching liquid 68 is moved to the groove 67 at the crossing of the waveguides on the lower heater 73 at a lower temperature by the thermal capillary action, thereby entering again the states as shown in FIGS. 41 and 42.

Thus, by the electric current flowing through the two lower heaters 72 and 73, the refractive index matching liquid 68 is moved in the groove 67 so that the refractive index matching liquid 68 can or cannot touch the core 65 of the X-type cross waveguide 62, thereby passing or totally reflecting the light 61.

Furthermore, in addition to the method of moving the refractive index matching liquid 68 by heat as described above, a method of generating and removing the refractive index matching liquid 68 can also be used by selecting the refractive index matching liquid 68 having an appropriate boiling point, vaporizing the refractive index matching liquid 68 by the heat of the heater, and returning it back into the liquid.

Back in FIG. 39, since the number of reflections of the light 61 on the optical film 11 is one, the wavelength characteristic of the light output from the output fiber 3 is the reflection wavelength characteristic of the optical film 11.

Figure 40:
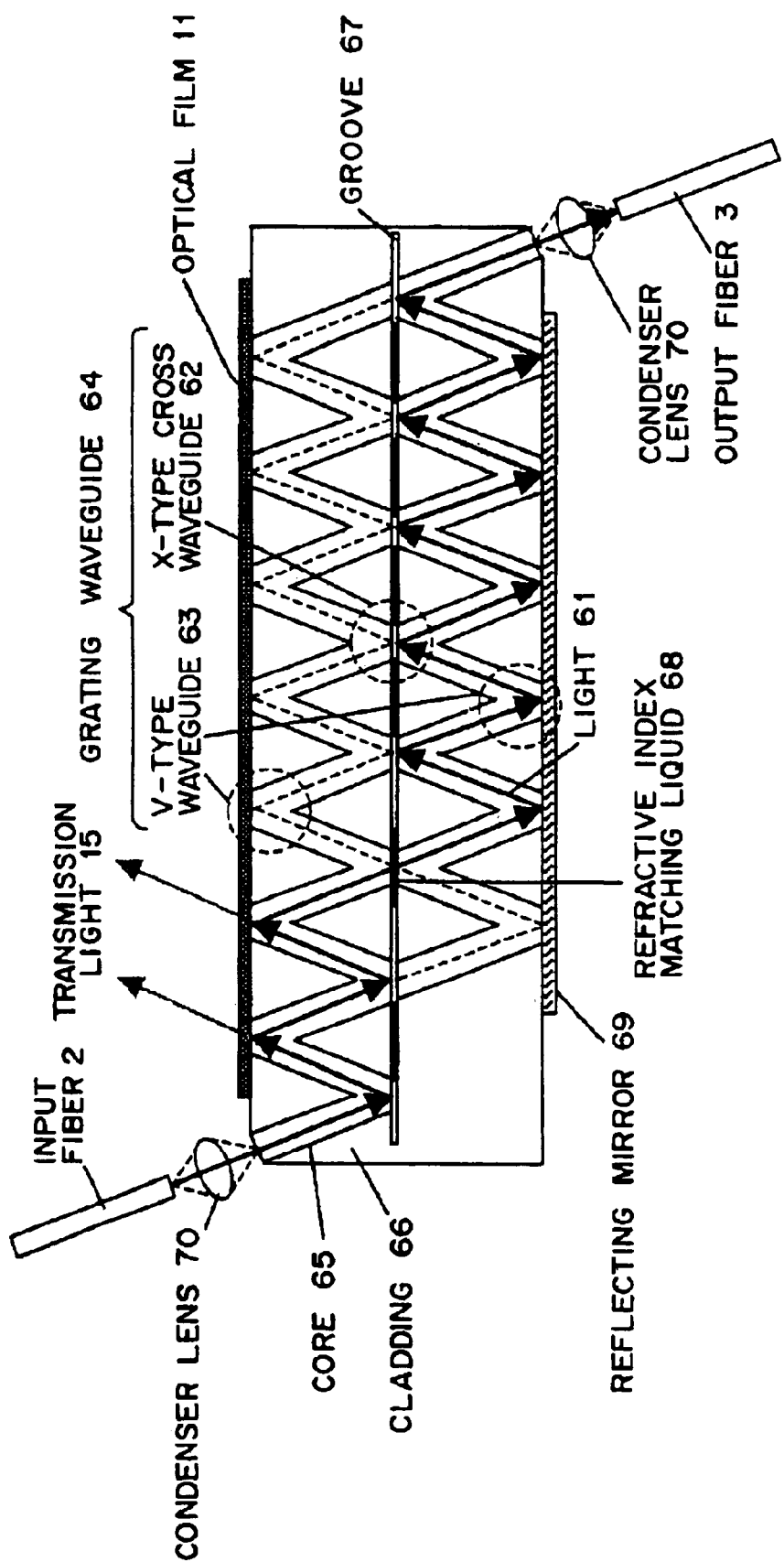
FIG. 40 shows the eighth embodiment (2) of the present invention.

On the other hand, FIG. 40 shows the refractive index matching liquid 68 only in the core 65 of the third cross waveguide 62 with the similar configuration as shown in FIG. 39, but without the refractive index matching liquid 68 in the core 65 of the second cross waveguide 62. At this time, the number of reflections of the light 61 on the optical film 11 is two, and the wavelength characteristic of the light output from the output fiber 3 is the characteristic obtained by twice accumulating the reflection wavelength characteristic of the optical film 11.

Thus, according to the present embodiment, by an electric current flowing through the lower heater of each cross waveguide 62, the refractive index matching liquid 68 of the groove 67 of each cross waveguide 62 is moved to an appropriate position, and the optical path of the light 61 is appropriately selected, thereby stepwise changing the wavelength characteristic of the light output from the output fiber 3 as if the reflection wavelength characteristic of the optical film 11 were accumulated. According to the present embodiment, the wavelength characteristic is changed as in the first embodiment (shown in FIG. 6) because the optical film 11 having the same wavelength characteristic as in the first embodiment is used, thereby realizing a gain equalizer.

In FIGS. 39 and 40, the total number of the reflections of the light 61 between the input/output fibers 2 and 3 is fourteen, and the optical path of the light 61 between the input/output fibers 2 and 3 is unchanged.

Thus, according to the present embodiment, when the reflection count on the optical film 11 is changed, the optical path of the light 61 between the input/output fibers 2 and 3, and the total number of reflections of the light 61 are unchanged. Therefore, the loss is not changed although the loss depends on the optical path of the waveguide, and the reflectance of the reflecting mirror is not sufficiently high.

According to the eighth embodiment, a reflecting type optical filter is used, but a transmission type optical filter can also be used.

Figure 45:
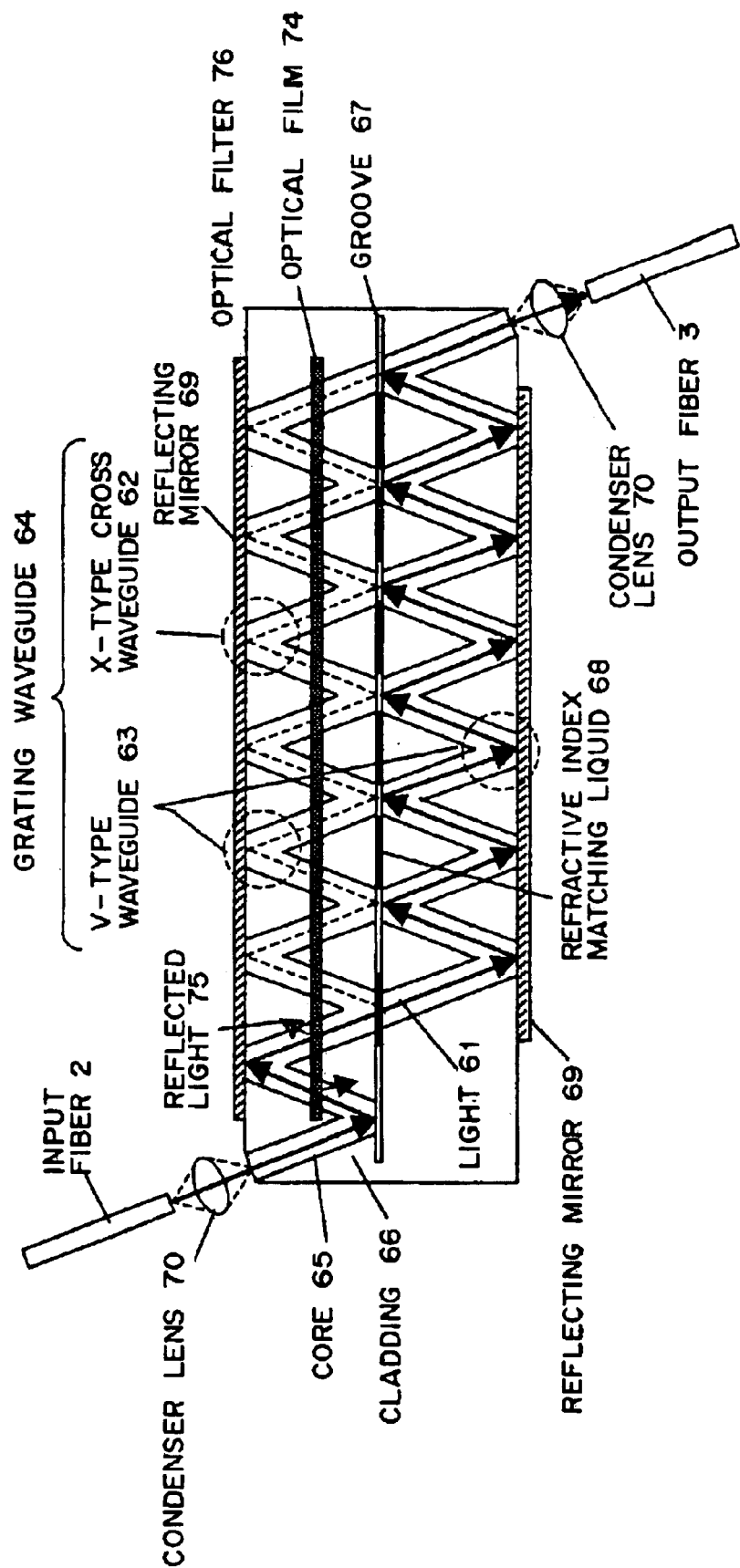
FIG. 45 shows the ninth embodiment (1) of the present invention.
Figure 46:
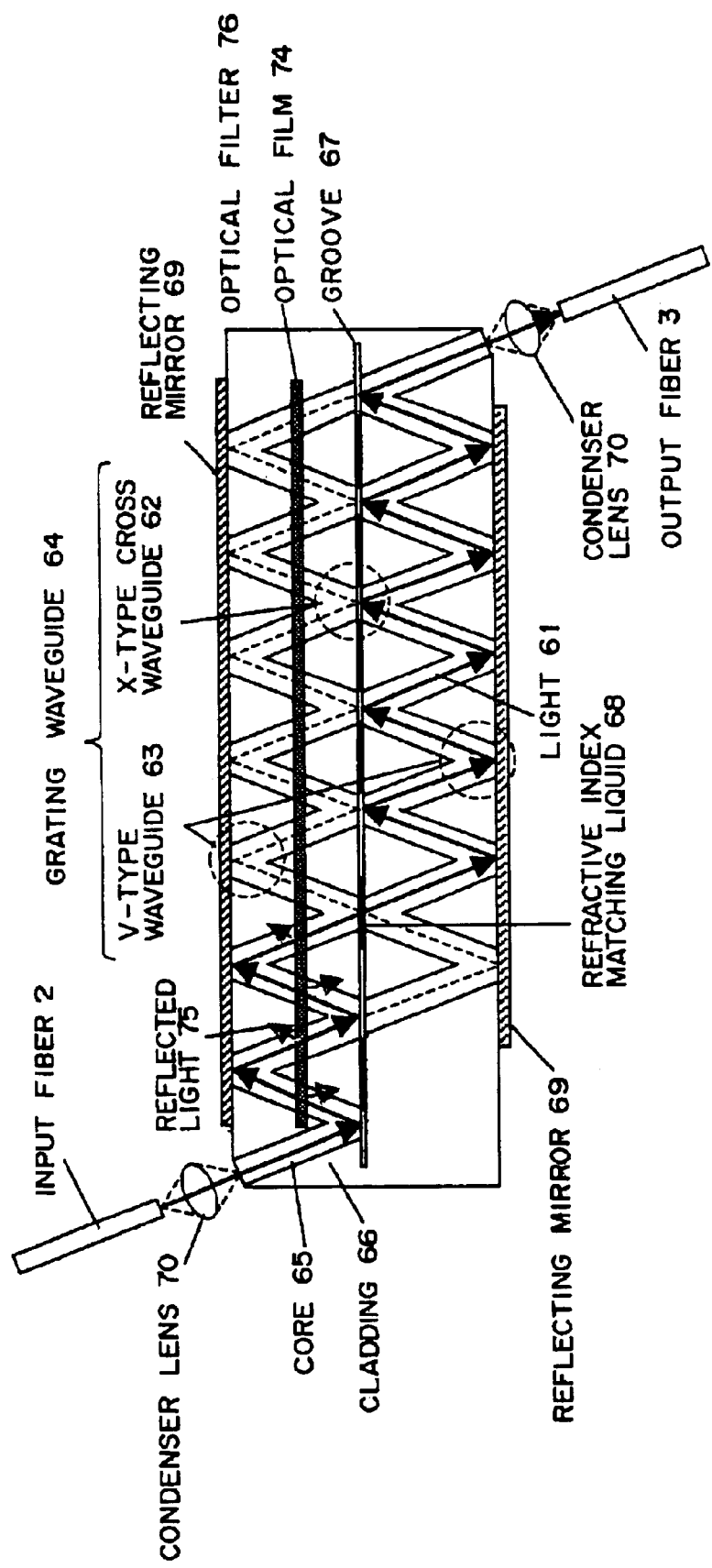
FIG. 46 shows the ninth embodiment (2) of the present invention.

FIGS. 45 and 46 show the ninth embodiment.

The ninth embodiment is different from the eighth embodiment in that the reflecting mirrors 69 are formed at both ends of the V-type waveguide 63, and a transmission type optical filter 76 having a desired wavelength characteristic is inserted into the cross waveguide provided with a groove. The transmission type optical filter 76 according to the present embodiment comprises an optical film 74 formed by a dielectric multilayer film applied on a thin filter, and has a desired transmission characteristic at an incident angle depending on the angle of a waveguide. The transmission wavelength characteristic of the optical film 74 according to the present embodiment is designed to be equal to the characteristic of the optical film 19 according to the third embodiment.

According to the present embodiment, the reflecting mirror 69 is formed at the end of the V-type waveguide 63, but the reflecting mirror 69 is not always required, and a reflection end can be obtained by the total reflection by the refractive index difference between the core 65 of the V-type waveguide 63 and air.

Described below is the path of the light 61. The light 55 output from the input fiber 2 is collected by the condenser lens 70, then converged into the core 65 exposed at the end of the grating waveguide 64, and transmitted through the core 65 of the grating waveguide 64. Then, the light is turned back by the total reflection from the refractive index difference between the core 65 and thin air in the groove 67 formed in the first cross waveguide 62, and passes through the optical film 74. Then, the light 61 is reflected by the reflecting mirror 69, transmitted through the optical film 74, and directed to the groove 67 through the core 65. Since there is the refractive index matching liquid 68 having the same refractive index as the core 65 of the waveguide in the groove 67 of the second cross waveguide 62, the light 61 passes straight without the total reflection by the groove 67, and is reflected by the reflecting mirror 69 at the end of the V-type waveguide 63. Furthermore, the transmission light 75 of the optical film 74 is discarded without converging into a waveguide. Then, the light 61 is totally reflected by the groove 67, repeatedly reflected plural times by the reflecting mirror 69 at the end of the V-type waveguide 63, output from the end of the grating waveguide 64, collected by the condenser lens 70 again, and then converged into the output fiber 3.

Thus, according to the present embodiment, each time the light 61 is turned back by the groove 67, it is assumed that the light passes through the optical film 74 twice. In FIG. 45, the number of transmissions of the light 61 through the optical film 74 is two, and the wavelength characteristic of the light output from the output fiber 3 is the characteristic obtained by twice accumulating the transmission wavelength characteristic of the optical film 74.

On the other hand, in FIG. 46, no refractive index matching liquid 68 is contained in the core 65 of the second cross waveguide 62, and the refractive index matching liquid 68 is contained only in the core 65 of the third cross waveguide 62 with the configuration shown in FIG. 45. At this time, the wavelength characteristic of the light output from the output fiber 3 is the characteristic obtained by four times accumulating the reflection wavelength characteristic of the optical film 19.

Thus, according to the present embodiment, by the electric current flowing through the lower heaters 72 and 73 of each cross waveguide 62, appropriately moving the refractive index matching liquid 68 of the groove 67 of each cross waveguide 62 to an appropriate position of the refractive index matching liquid 68, and by appropriately selecting the optical path of the light 61, the wavelength characteristic of the light output from the output fiber 3 can be stepwise changed as if the transmission wavelength characteristic of the optical film 74 were accumulated. According to the present embodiment, the optical film 74 having the wavelength characteristic similar to that of the optical film 19 according to the third embodiment is used, the change of the wavelength characteristic is similar to that according to the third embodiment (shown in FIG. 15). Therefore, it is applicable as a gain equalizer.

The total number of reflections of the light 61 between the input/output fibers 2 and 3 is 14 as is, and the optical path of the light 61 between the input/output fibers 2 and 3 is also unchanged.

According to the present embodiment, when the number of transmissions on the optical film 74 is changed, the optical path of the light 61 between the input/output fibers 2 and 3 and the total number of reflections of the light 61 are unchanged. Therefore, the loss is unchanged although the loss depends on the optical path of a waveguide, and the reflectance of the reflecting mirror is not sufficiently high.

Described above are the embodiments of the present invention, but the present invention is not limited to these applications. It is obvious that a number of improvements and variations can be realized.

As described above, the wavelength characteristic variable apparatus according to the present invention comprises at least a pair of input/output fibers, an optical filter having a desired wavelength characteristic, and a reflection element for turning back plural times an optical beam output from the fiber, and allowing the optical filter to input the optical beam plural times. With the configuration, it practically varies the wavelength characteristic by changing the number of times the optical beam is input into the optical filter. Therefore, by changing the number of times an optical beam is input (transmitted or reflected) into an optical filter, the wavelength characteristic of the optical filter is accumulated and the wavelength characteristic can be changed stepwise. As a result, a wavelength characteristic variable apparatus capable of freely changing the wavelength characteristic, and an optical amplifier and a wavelength multiplexed transmission device using the wavelength characteristic variable apparatus can be provided with a simple configuration.

Furthermore, the present invention can also comprise at least a pair of input/output fibers, an optical filter having a desired wavelength characteristic, a reflection element for turning back plural times an optical beam output from the fiber, and allowing the optical filter to input the optical beam plural times, and a reflection element provided to constantly maintain the optical path of the optical beam between the input/output fibers and a constant number of times the optical beam is reflected. With the configuration, it practically varies the wavelength characteristic by changing the number of times the optical beam is input into the optical filter while constantly maintaining the optical path of the optical beam and the number of reflections. Therefore, the optical path of the optical beam and the reflection count are constantly maintained independent of the entrance count, thereby keeping the excess loss unchanged.

What is claimed is:

1. A wavelength characteristic variable apparatus, comprising:

an optical filter unit having a desired wavelength characteristic; and a reflection unit capable of turning back an input optical beam, and varying a number of times the optical beam is input into said optical filter unit, wherein said wavelength characteristic can be effectively varied by changing a number of times the optical beam is input into said optical filter unit.

2. The apparatus according to claim 1, further comprising:

a second reflection unit maintaining a constant optical path through which said optical beam is transmitted from input to output and a constant number of times the optical beam is reflected.

3. The apparatus according to claim 1, wherein said reflection unit can vary a number of times said optical beam is turned back and a number of times said optical beam is input into said optical filter unit through a spatial movement.

4. The apparatus according to claim 3, wherein said reflection unit has a hole through which an optical path through which the optical beam is input plural times into said optical filter unit is connected to an optical path through which the optical beam is transmitted without an influence of a wavelength characteristic.

5. The apparatus according to claim 1, wherein said reflection unit comprises a plurality of mirrors, wherein said plurality of mirrors are provided for an optical path of the optical beam to change the optical path of the optical beam, and a number of times the optical beam is input into said optical filter unit can be varied.

6. The apparatus according to claim 1, wherein said optical path of the optical beam comprises a waveguide, a groove crosses the waveguide, and a refractive index matching unit passing the optical beam or totally reflecting the optical beam is provided at a portion of the groove through which the optical beam passes, thereby configuring said reflection unit.

7. The apparatus according to claim 6, wherein said refractive index matching unit is configured by a liquid having substantially the same refractive index as said waveguide, said liquid is moved, vaporized, or condensed by heating and cooling processes.

8. The apparatus according to claim 6, wherein said refractive index matching unit is designed such that an optical path through which the optical beam passes to enter said optical filter unit can be equal to an optical path through which the optical beam passes without entering said optical filter unit.

9. The apparatus according to claim 1, wherein a desired wavelength characteristic is provided by connecting a plurality of wavelength characteristic variable apparatuses in series and combining wavelength characteristics of the plurality of wavelength characteristic variable apparatuses.

10. The apparatus according to claim 1, wherein said optical filter unit is a reflecting type optical filter having a desired reflection wavelength characteristic, and the optical beam has a desired wavelength characteristic when the optical beam is reflected by said reflecting type optical filter.

11. The apparatus according to claim 1, wherein said optical filter unit is a transmission type optical filter having a desired transmission wavelength characteristic, and said optical beam obtains a desired wavelength characteristic by passing through said reflecting type optical filter.

12. The apparatus according to claim 1, wherein said reflection unit comprises at least two reflecting mirrors provided on both sides of said optical filter, and said reflecting mirrors are mounted not to be parallel to said optical filter unit.

13. The apparatus according to claim 1, wherein said optical filter unit comprises an optical film formed by a dielectric multilayer film.

14. The apparatus according to claim 1, wherein said optical filter unit comprises an etalon filter.

* * * * *